(12) United States Patent
Cserna et al.

(10) Patent No.: US 11,959,760 B2
(45) Date of Patent: Apr. 16, 2024

(54) PASSENGER PREFERENCE ROUTE AND ALTERNATIVE DESTINATION ESTIMATOR

(71) Applicant: Motional AD LLC, Boston, MA (US)

(72) Inventors: Bence Cserna, East Boston, MA (US); Kevin C. Gall, Dover, NH (US); Alexander Brown, Dover, NH (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/676,267

(22) Filed: Feb. 21, 2022

(65) Prior Publication Data

US 2023/0266139 A1   Aug. 24, 2023

(51) Int. Cl.
| | | |
|---|---|---|
| G01C 21/36 | (2006.01) | |
| B60W 60/00 | (2020.01) | |
| G01C 21/34 | (2006.01) | |
| G06N 3/08 | (2023.01) | |

(52) U.S. Cl.
CPC ... *G01C 21/3617* (2013.01); *B60W 60/00253* (2020.02); *G01C 21/3461* (2013.01); *G01C 21/3484* (2013.01); *G01C 21/3664* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 2013/0018574 A1* | 1/2013 | Adler | ................ | G01C 21/3492 701/527 |
| 2017/0184409 A1* | 6/2017 | Glasgow | .......... | G08G 1/096816 |
| 2017/0186315 A1 | 6/2017 | Glasgow et al. | | |
| 2018/0274930 A1 | 9/2018 | Wisburn et al. | | |
| 2020/0104965 A1 | 4/2020 | Ramot et al. | | |
| 2020/0242583 A1 | 7/2020 | Sawyer et al. | | |
| 2020/0249047 A1* | 8/2020 | Balva | ................. | G06Q 10/0631 |
| 2020/0318982 A1* | 10/2020 | Shirani-Mehr | ....... | H04W 4/029 |
| 2021/0019671 A1 | 1/2021 | Cao et al. | | |
| 2021/0172753 A1* | 6/2021 | Johnson, Jr. | ........ | G01C 21/3476 |

FOREIGN PATENT DOCUMENTS

WO    WO2020092635    *  5/2020

OTHER PUBLICATIONS

Great Britain Office Action issued for Application No. GB 2203789.9, dated Sep. 21, 2022.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

* cited by examiner

*Primary Examiner* — Hongye Liang
(74) *Attorney, Agent, or Firm* — Knobbe, Martens, Olson & Bear, LLP

(57) ABSTRACT

Disclosed is a method including obtaining, using at least one processor, a user destination; obtaining, using the at least one processor, preference data indicative of a user route preference; determining, using the at least one processor, based on the user destination and the preference data, a set of routes towards a set of destinations, wherein at least one route of the set of routes is associated with one or more operational metrics; ranking, using the at least one processor, based on the preference data, the routes of the set of routes; and controlling, using the at least one processor, based on at least one of the ranked routes, navigation of an autonomous vehicle Systems and computer program products are also provided.

28 Claims, 13 Drawing Sheets

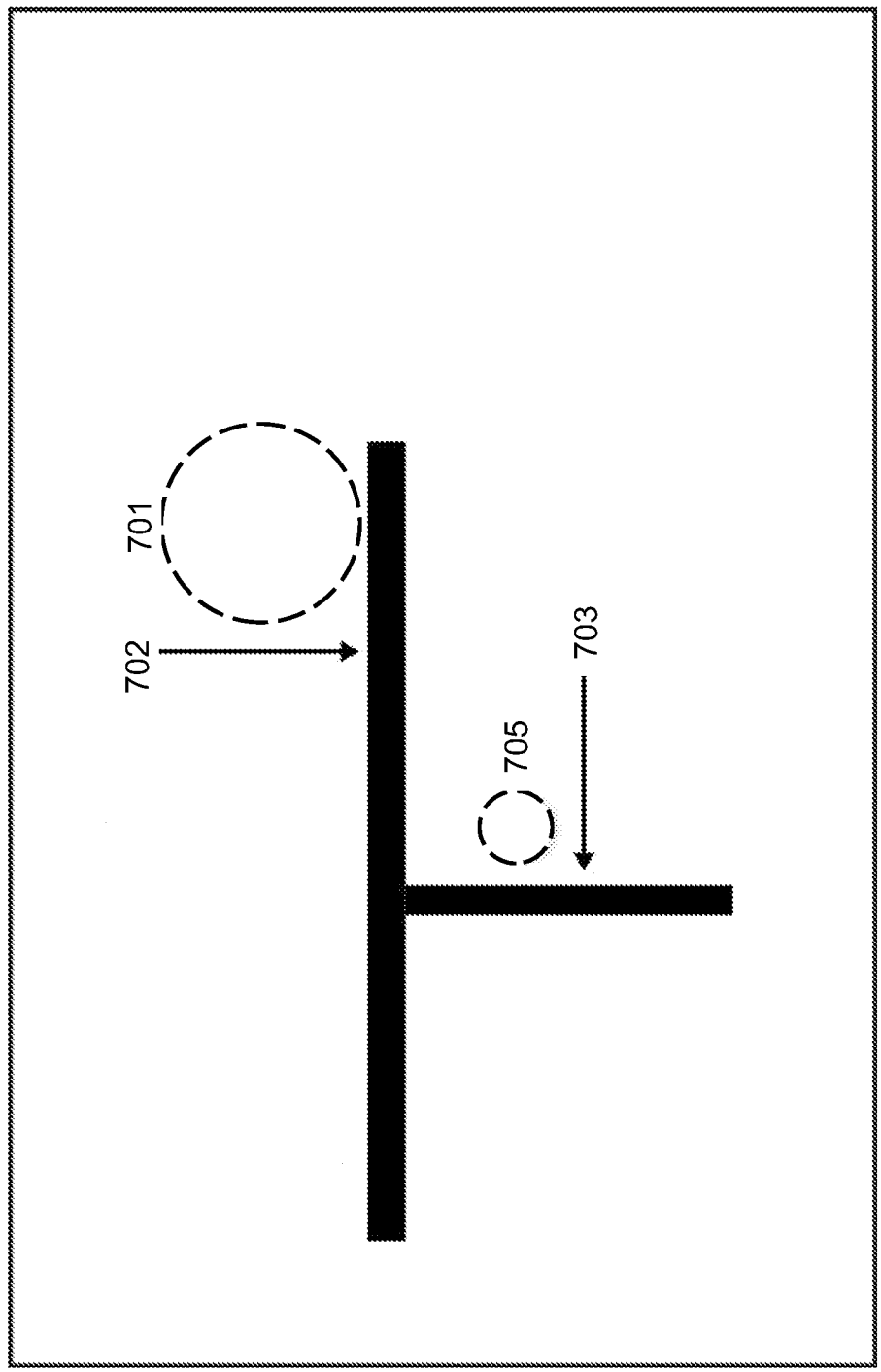

PASSENGER PREFERENCE ROUTE AND ALTERNATIVE DESTINATION ESTIMATOR

BACKGROUND

A passenger may enter an address that is not optimal for reaching their true final destination, e.g. a staff-only entrance to a stadium. This results in significant impact on characteristics of a ride and/or of a navigation that may not be aligned with a passenger expectation.

BRIEF DESCRIPTION OF THE FIGURES

FIGS. 7A-7B are diagrams of an example illustration of alternative routes;

DETAILED DESCRIPTION

Figure 1:
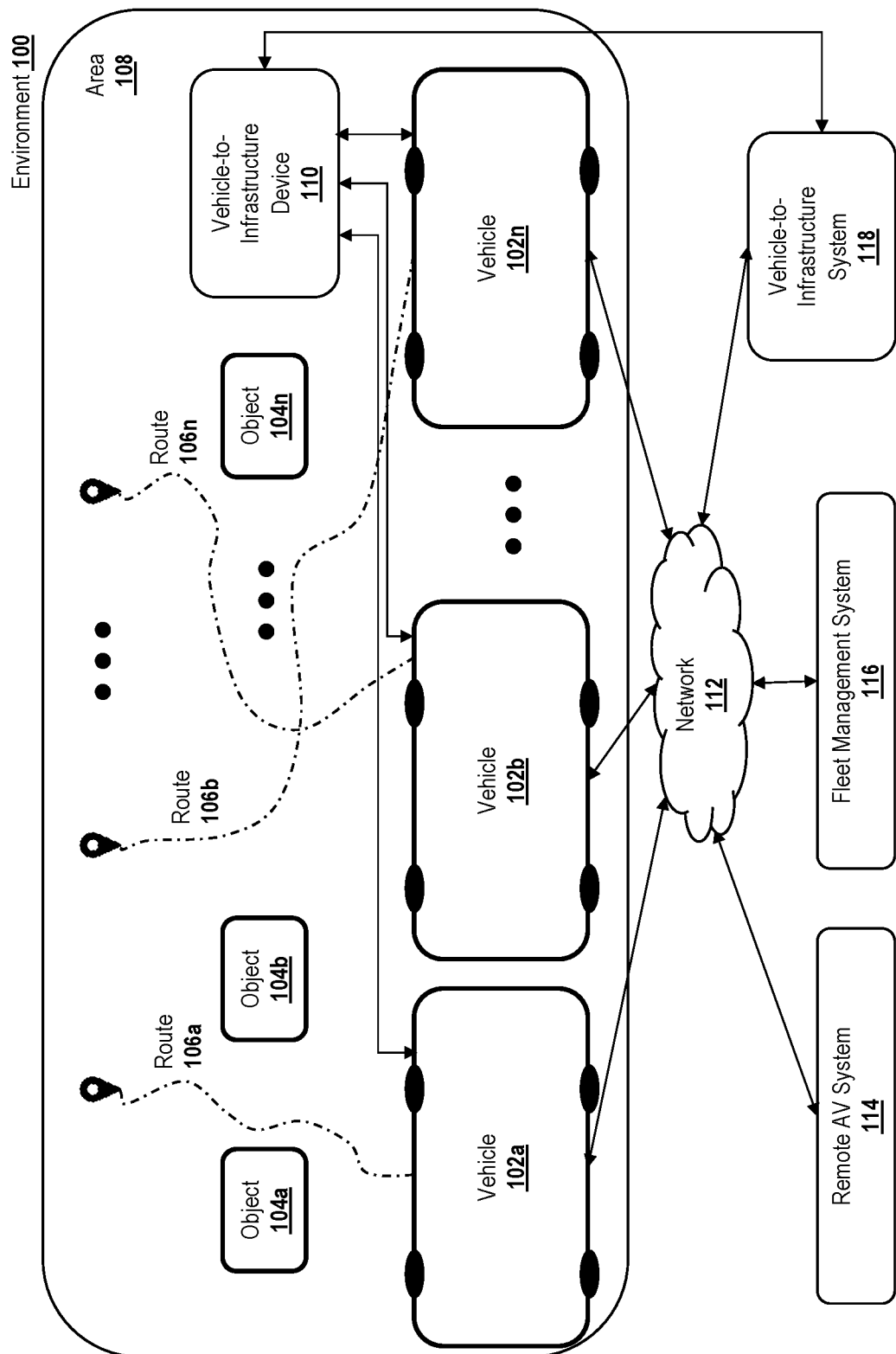
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Some embodiments of the present disclosure are described herein in connection with a threshold. As described herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

General Overview

In some aspects and/or embodiments, systems, methods, and computer program products described herein provide adjustments to a user destination, e.g. a target destination and/or route based on user route preferences of a passenger and an expected user destination for the passenger. The present disclosure also provides systems, methods, and computer program products that can estimate alternative destinations for a user based on an intended user destination. Further, systems, methods, and computer program products can weight user route preferences for determination of routes, alternative routes and/or alternative destinations. Systems, methods, and computer program products can determine alternative destinations which may be easier to access and/or alternative routes which may be more varied.

By virtue of the implementation of systems, methods, and computer program products described herein, techniques for operating an autonomous vehicle and/or for navigation of an autonomous vehicle can improve the accuracy and efficiency of an autonomous vehicle for navigating a passenger to a user destination, e.g. a target destination. These techniques can enable the passenger and/or a service, e.g. a ride service, to adjust the target destination and route based on user route preference(s) and the expected user destination for the passenger. These techniques can provide the passenger and the service alternative destinations for drop off and alternative routes that may positively impact various parameters such as time to destination, distance travelled, post drop off walking distance, and/or price, which may match user route preferences of the passenger.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 8:
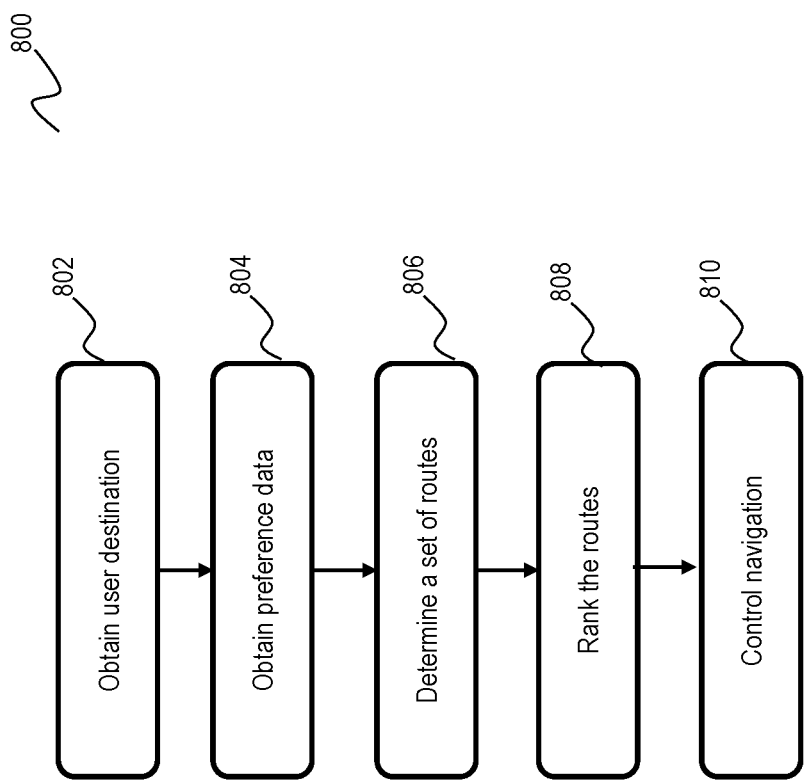
FIG. 8 is a flowchart of an example process for providing passenger preference route.
Figure 9:
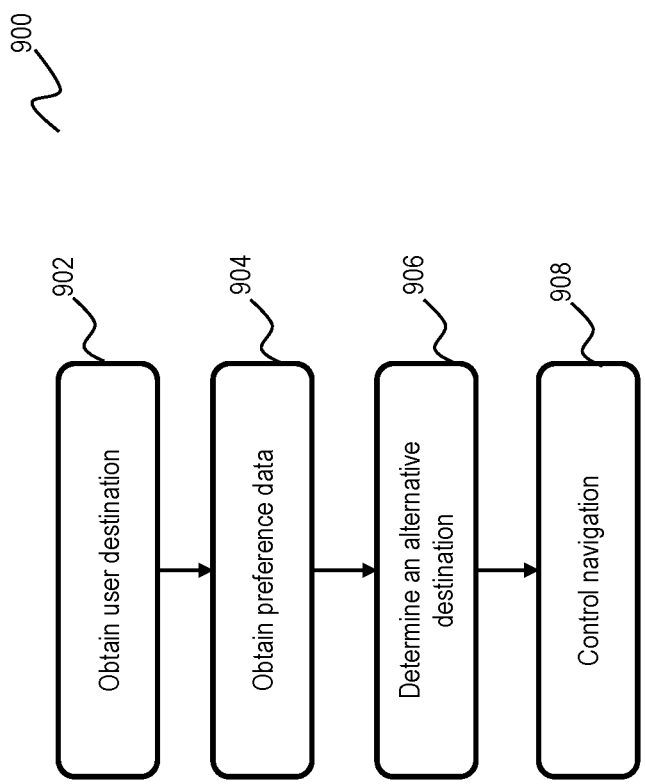
FIG. 9 is a flowchart of an example process for providing alternative destination.

In some embodiments, device 300 is configured to execute software instructions of one or more steps of the disclosed method, as illustrated in FIG. 8 and FIG. 9.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
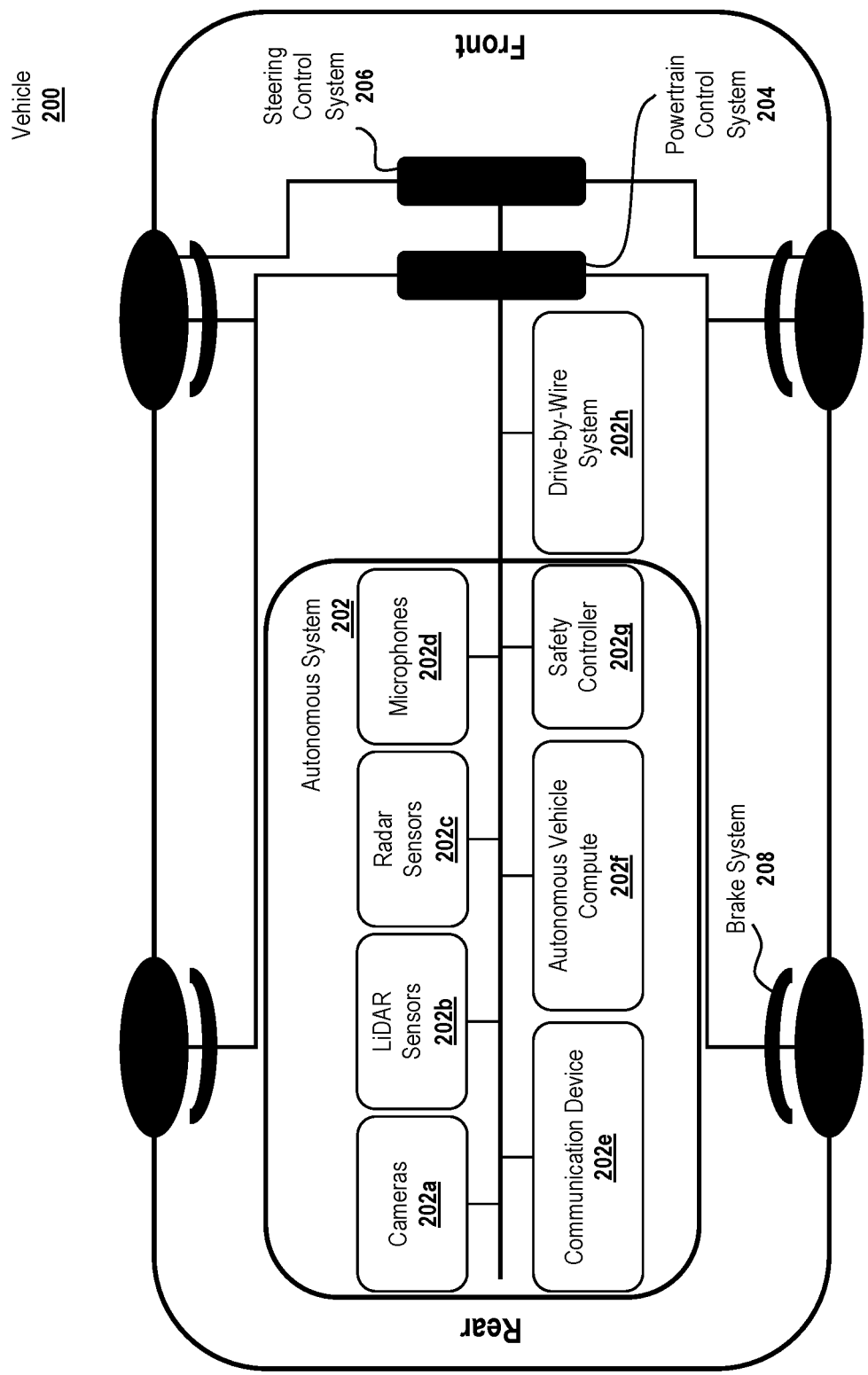
FIG. 2 is a diagram of one or more example systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and safety controller 202g.

Figure 3:
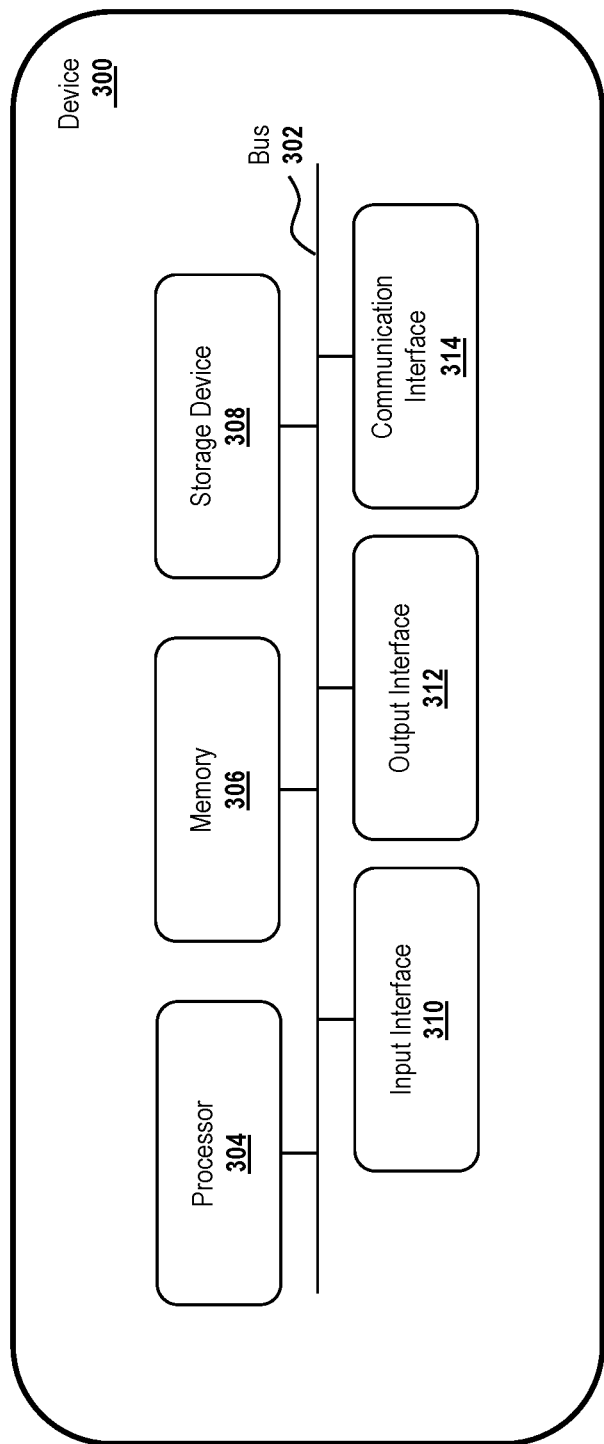
FIG. 3 is a diagram of components of one or more example devices and/or one or more example systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW (Drive By Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
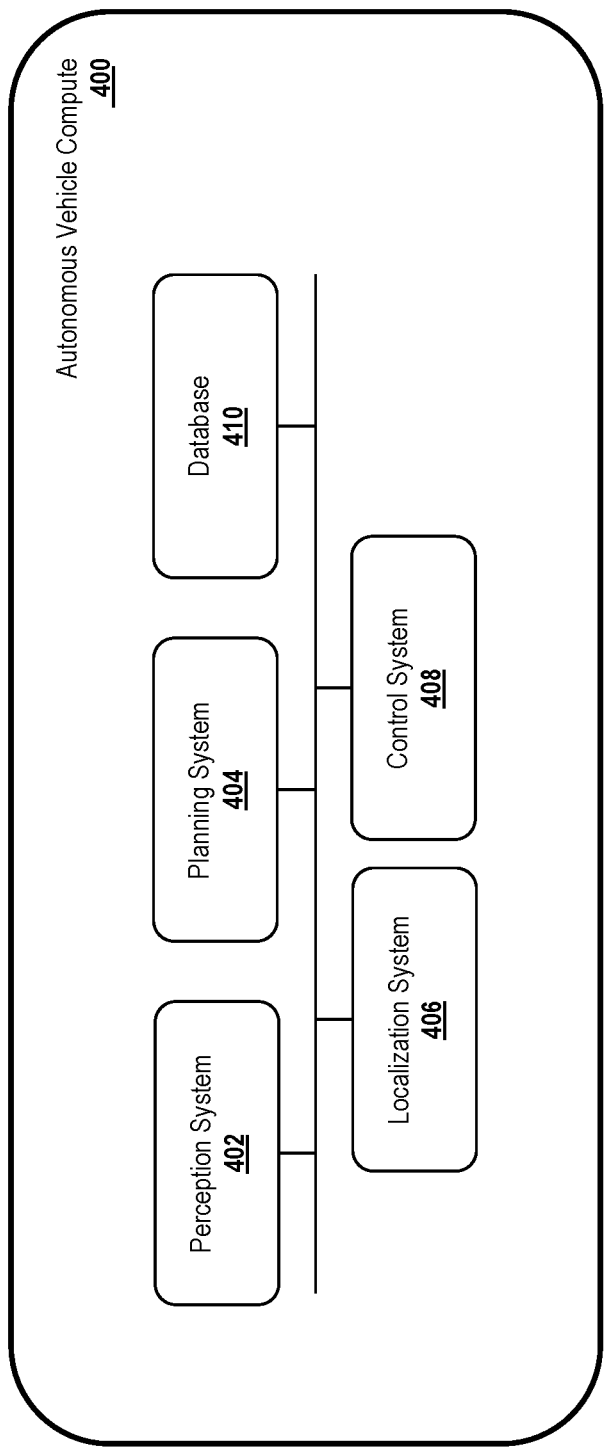
FIG. 4A is a diagram of certain components of an example autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIG. 4B.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
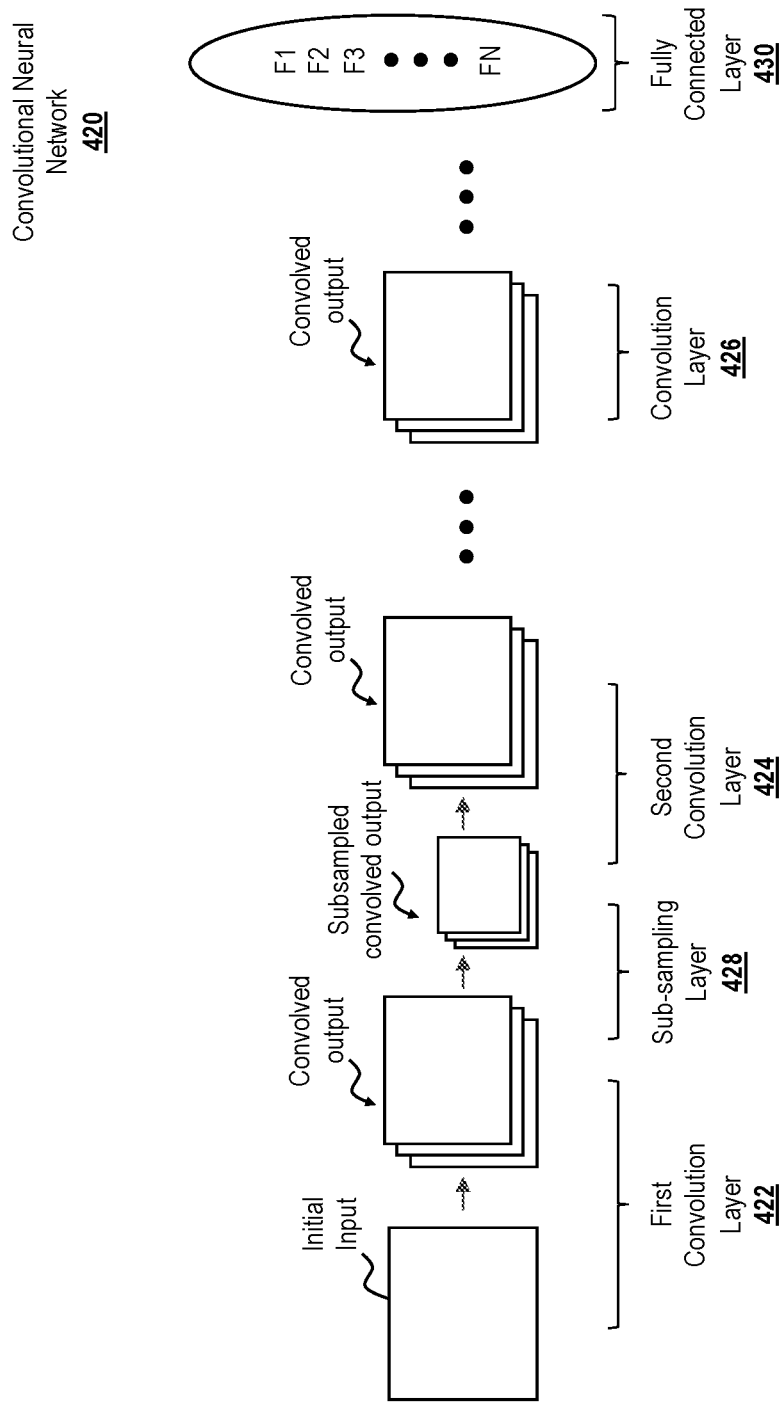
FIG. 4B is a diagram of an example implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., a number of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the number of computations necessary for CNN 420 to perform downstream convolution operations. Additionally, or alternatively, by virtue of sub-sampling layer 428 being associated with (e.g., configured to perform) at least one subsampling function, CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like).

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 420 normalizing sensor data (e.g., image data, LiDAR data, radar data, and/or the like).

In some embodiments, CNN 420 generates an output based on perception system 420 performing convolution operations associated with each convolution layer. In some examples, CNN 420 generates an output based on perception system 420 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

The present disclosure relates to systems, methods, and computer program products that provide for adjustments to a user destination and/or route based on preferences of the passenger and the user destination for the passenger. The present disclosure also provides systems, methods, and computer program products that can estimate alternative destinations for a user based on an intended user destination.

Further, systems, methods, and computer program products can weight user preferences for determination of routes, alternative routes and/or alternative destinations. Systems, methods, and computer program products can determine alternative destinations which may be easier to access and/or alternative routes which may be more varied.

Figure 5:
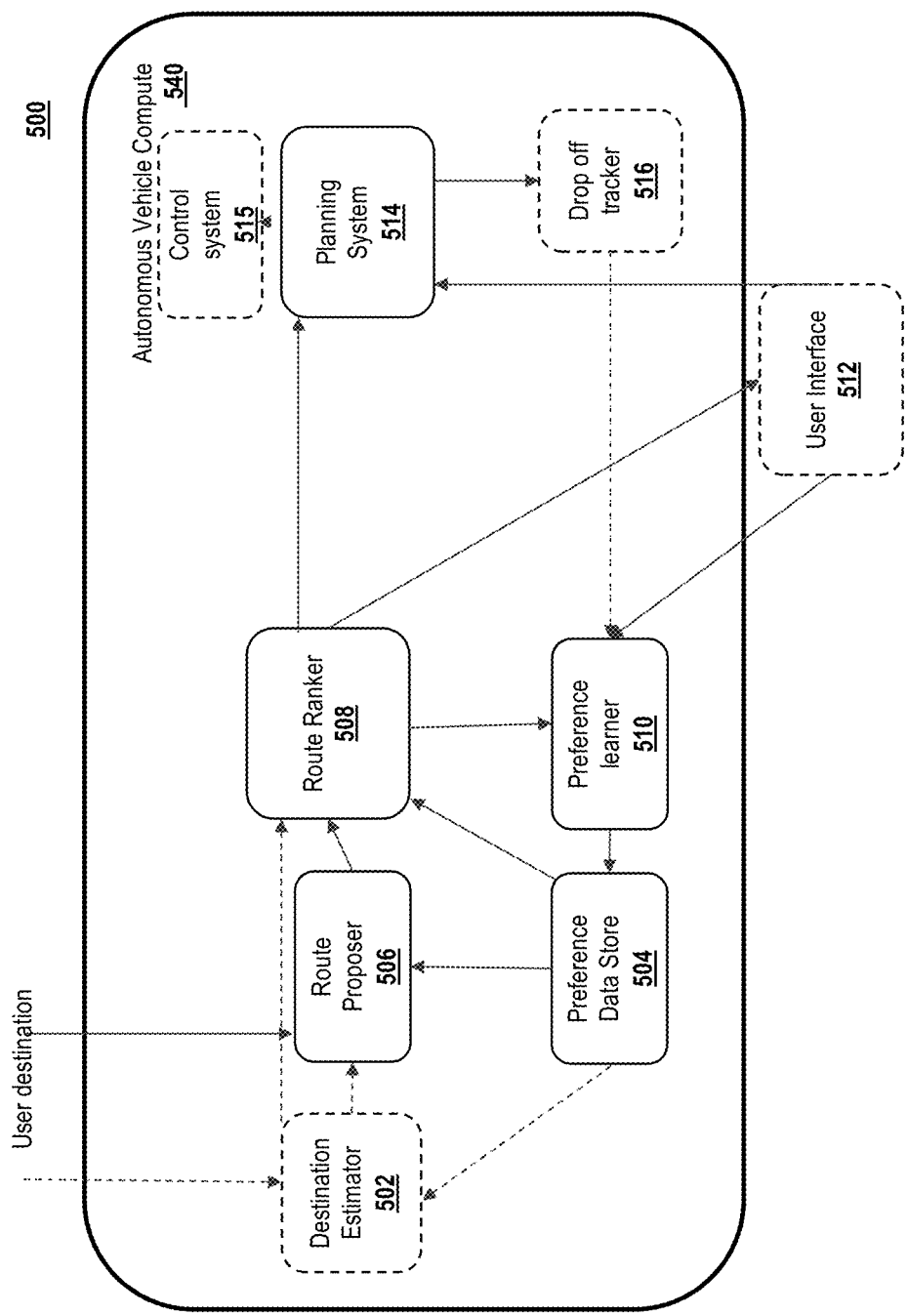
FIG. 5 is a diagram of an example implementation of a process for providing passenger preference route.

Referring now to FIG. 5, illustrated is a diagram of an implementation of a system 500 for providing passenger-preference route(s), e.g. for navigation, such as for controlling and/or operating an autonomous vehicle, AV. In some examples, implementation or system 500 includes an AV compute 540, and a vehicle (similar to vehicle 200 of FIG. 2, such as an autonomous vehicle). In some examples, system 500 is the same as an autonomous system or like system, such as an AV (e.g. illustrated in FIGS. 2, 3 and 4), an AV system, a remote AV system, a fleet management system, and a V2I system. The system 500 can be for operating an autonomous vehicle. The system 500 may not be for operating an autonomous vehicle.

Disclosed is a system, such as system 500 of FIG. 5. In one or more example systems, the system 500 includes at least one processor. In one or more example systems, the system 500 includes memory and/or at least one non-transitory computer readable medium storing instructions that, when executed by the at least one processor, cause the at least one processor to perform operations including obtaining, using the at least one processor, a user destination. In one or more example systems, the system 500 is configured to obtain, using the at least one processor, preference data indicative of a user route preference. In one or more example systems, the system 500 is configured to determine, using the at least one processor, based on the user destination and the preference data, a set of routes towards a set of destinations. In one or more example systems, at least one route of the set of routes is associated with one or more operational metrics. In one or more example systems, the system 500 is configured to rank, using the at least one processor, based on the preference data, the routes of the set of routes. In one or more example systems, the system 500 is configured to control, using the at least one processor, based on at least one of the ranked routes, navigation of an autonomous vehicle.

By virtue of the implementation of systems, methods, and computer program products described herein, techniques for operating an autonomous vehicle and/or for navigation of an autonomous vehicle can improve the accuracy and/or efficiency of an autonomous vehicle for navigating a passenger to a user destination. These techniques can enable the passenger and/or a service, e.g. a ride service, to adjust the user destination and/or route based on user route preference(s) related to these features and the expected final destination for the passenger. These techniques can provide the passenger and the service, alternative destinations for drop off and alternative routes that may impact positively various parameters such as time to destination, distance travelled, post drop off walking distance, and/or price, which may match user route preferences of the passenger. Stated differently, the disclosed techniques can allow predicting of an alternative destination and/or an alternative route for where the passenger may intend to go.

In one or more example systems, the system 500 is configured to obtain, using the at least one processor, a user destination. The user destination can be seen as a destination provided by user input, optionally via a ride service. The user destination can be provided by a ride service. The user destination can be proposed by a ride service. The user destination can be a target destination, such as a requested destination, optionally provided via a user input from the passenger. The user destination can be one or more of: a geographic location, a point of interest, a landmark, and/or an area.

In one or more example systems, the system 500 is configured to obtain, using the at least one processor, preference data indicative of a user route preference. For example the system 500 is configured to receive and/or retrieve preference data from a user preference database or from a preference data store, such as preference data store 504, such as a user preference store.

The preference data may be seen as data representative of one or more user route preferences. A user route preference may be seen as a preference of a user, such as a preference of a passenger regarding a route and/or travel and/or a destination. A user route preference can be seen as a user preference, e.g. in terms of time-to-destination, price, walking time, accessibility, legality, and/or energy consumption. The preference data can include user data, such as user profile data. The user data may include passenger data indicative of one or more of: age, gender, status, and/or disability status.

In one or more example systems, the preference data comprises one or more attributes indicative of the user route preference, e.g. regarding an operational metric. For example, for time-to-destination, an attribute can indicate a user preference for being early at the user destination. For example, for price, an attribute can indicate a user preference for minimizing price. For example, for walking time, an attribute can indicate a user preference providing a walking distance threshold. For example, for accessibility and/or legality considerations, an attribute can indicate a user preference for avoiding crossing a street after drop-off. For example, for traffic, an attribute can indicate a user preference for avoiding traffic (e.g. minimizing). For example, for energy consumption and/or gas emission an attribute can indicate a user preference for minimizing the energy consumption and/or gas emission. In one or more examples, preference data can include historic and/or previous preference data. Previous preference data can be based on preference(s) and/or route(s) and/or drop-off(s) chosen and/or collected in the past. A passenger can optionally configure preferences at a high level, thereby resulting in corresponding preference data. For example, independent attributes, e.g. cost, walking distance, time, can be configured by the passenger, with various level of importance, e.g. "not important", "somewhat important", "very important", "highest priority". This may lead to weight(s) given to an attribute based on its corresponding level of importance. In one or more example systems, the attribute(s) can be configured by the passenger via a user interface, such as user interface 512, such as a user interface provided on a device of the passenger, which transmits the attribute(s) to the system 500. The user route preferences can vary: for example Alice prefers to walk for a few minutes rather than wait in traffic; Bob wants to be dropped as close to his final destination as possible; Eve would like as cheap a ride as possible without walking more than 1 mile. The disclosed preference data can characterize the user routes preferences via attributes.

Figure 7A:
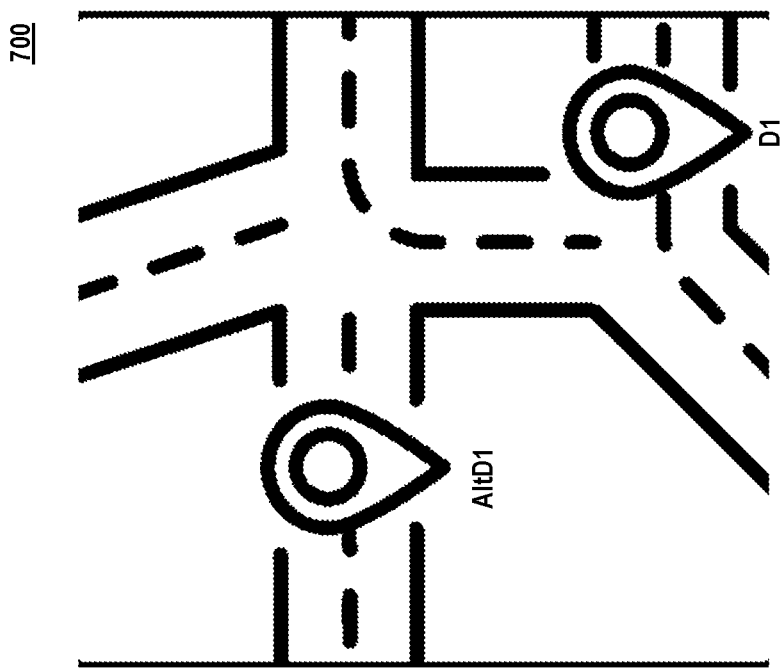
Figure 7A:
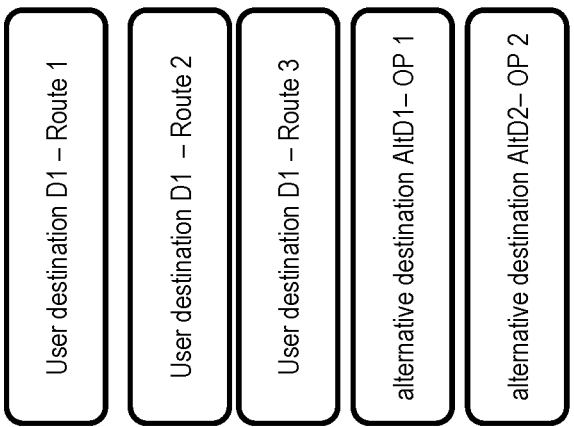
Figure 7C:
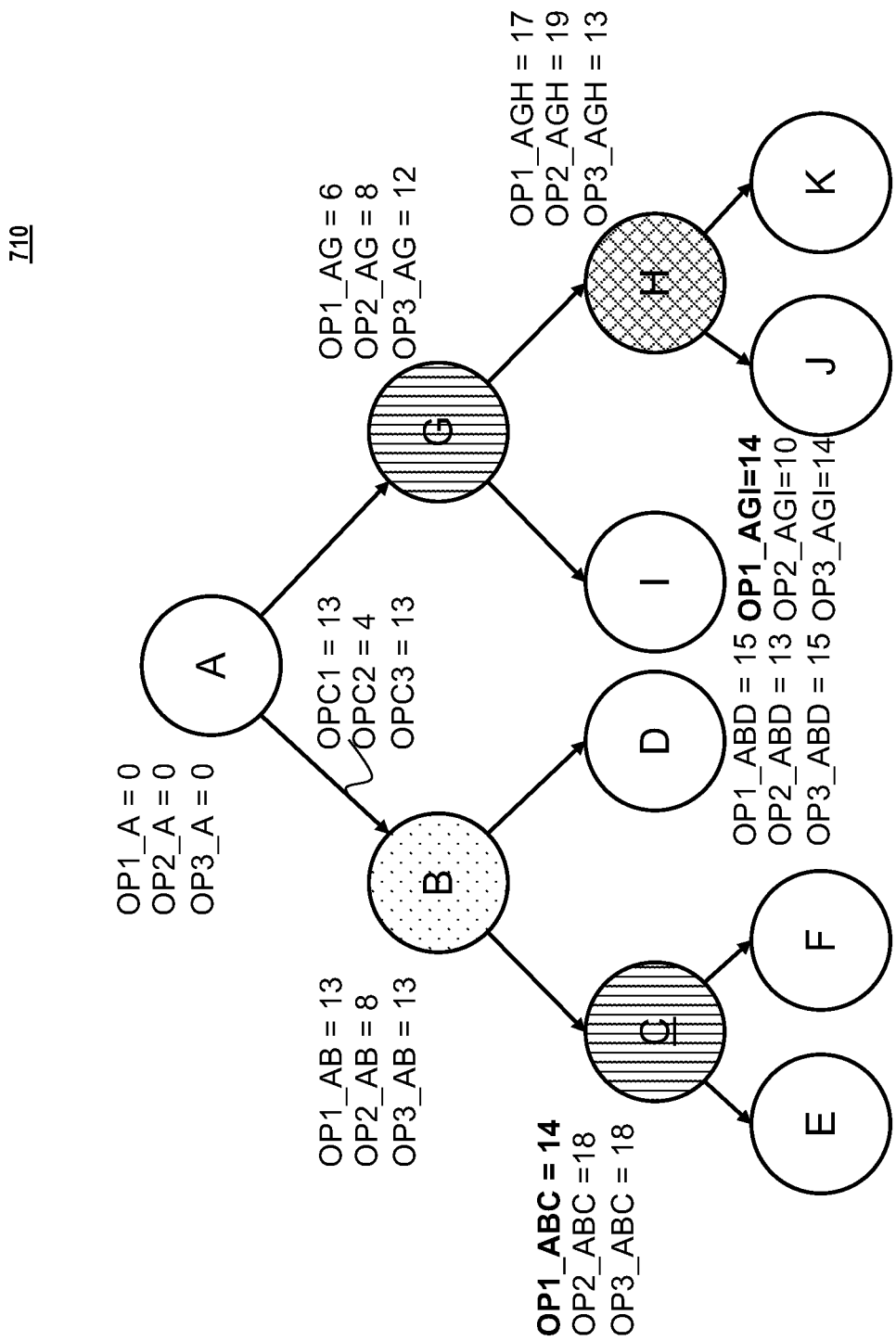
FIGS. 7C-7D are diagrams of an example illustration of example determinations of routes and example rankings of routes according to this disclosure.
Figure 7D:
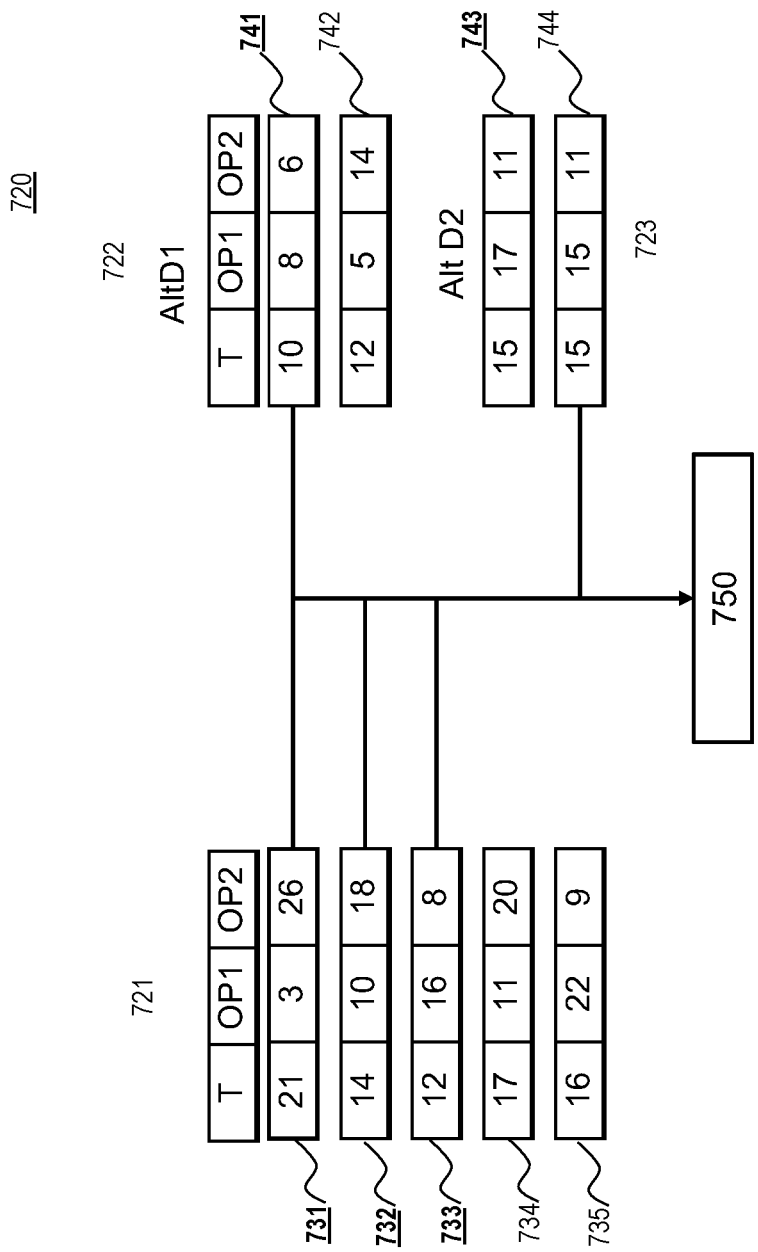

In one or more example systems, the system 500 is configured to determine, using the at least one processor, based on the user destination and the preference data, a set of routes, e.g. towards a set of destinations. In one or more example systems, the system 500 includes a route proposer 506 configured to determine, using the at least one processor, based on the user destination and the preference data, the set of routes towards the set of destinations. In other words, the system 500 can, using the route proposer 506, determine, using the at least one processor, based on the user destination and the preference data, the set of routes towards the set of destinations. The set of routes can include a first route to a first destination and a second route to the first destination, wherein the second route is different from the first route. The set of routes can include a first route to a first destination and a second route to the second destination. In In other words, the route proposer 506 can take as input the preference data (e.g. indicative of learned route preference and/or past route preferences) and can, based on the input, generate a set of routes with associated operational metric(s) (such as a total aggregate operational metric for each route, and/or each operational metric for a given operational dimension, as illustrated in FIG. 7D).

In one or more example systems, at least one route of the set of routes is associated with one or more operational metrics. For example, each route can be associated with one or more operational metrics.

An operational metric may be seen as a metric indicative of a route operational measure for a route, such as an operational cost function for a route. Examples of an operational metric can be a metric indicative of one or more of: price, time-to-destination, walking time, accessibility, traffic, and energy consumption. Stated differently, a route may be associated with a first operational metric indicative of price, and optionally a second operational metric indicative of time-to-destination, and optionally a third operational metric indicative of walking time to final destination, and optionally a fourth operational metric indicative of traffic, and optionally a fifth operational metric indicative of energy consumption. The preference data can affect the operational metric by applying a weight (given in the preference data) to the operational metric. The weight is configured to reflect the passenger preference. For example, when a passenger gives more preference to walking time than other aspects, the weight associated with an attribute indicative of walking time may be larger than weights for other attributes, and the weight is applied to operational metric indicative of walking time accordingly.

A set of routes can be determined, by the route proposed 506, towards a set of destination. For example the set of routes can be seen as a set of routes towards a same set of destinations. The set of destinations can include the user destination, and/or alternative destination(s) determined based on the user destination, such as in proximity to the user destination.

In one or more example systems, the system 500 is configured to rank, using the at least one processor, based on the preference data, the routes of the set of routes. For example, the system 500 includes a route ranker 508 configured to rank, using the at least one processor, based on the preference data, the routes of the set of routes. For example, the route ranker 508 ranks the routes of the set of routes, e.g. from the most preferred to the least preferred route based on the preference data. For example, the route ranker 508 ranks a part of the routes of the set of routes. In other words, the system 500 and/or the route ranker 508 can prioritize at least a part of the routes of the set of routes based on the preference data. For example, the preference data can indicate that the passenger prefers to avoid crossing the street after drop-off and does not have a preference for a lower price, the system 500 and/or the route ranker 508 can rank at least a part of the routes of the set of routes based on operational metric indicative of avoidance of street crossing after drop-off that is adjusted based on the preference data. Stated differently, a route having the highest operational metric indicative of avoidance of street crossing after drop-off is ranked with a higher order than a route providing the lowest operational metric indicative of price. The route ranker 508 can obtain preference data from the preference data store 504 and the set of routes with associated operational metric(s) from the route proposer 506.

In one or more example systems, the system 500 is configured to control, using the at least one processor, based on at least one of the ranked routes, navigation of an autonomous vehicle. For example, the system 500 includes a planning system 514 configured to provide navigation data to a control system (e.g. control system 515) of the AV. For example, the planning system 514 obtains at least one of the ranked routes from the route ranker 508 and control the navigation accordingly, e.g. by generating navigation data based on the at least one ranked route. In one or more example systems, the system 500 is configured to navigate according to the at least one of the ranked routes. For example, the system 500 includes control system 515.

In one or more example systems, for obtaining the preference data, the system 500 is configured to assign, based on a model, a weight to at least one attribute of the one or more attributes for a corresponding operational metric of the one or more operational metrics. For example, the route proposer 506 can assign, based on a model, a weight to at least one attribute of the one or more attributes for a corresponding operational metric of the one or more operational metrics. In one or more examples, the model is a global model that can learn to assign weights to the attributes, e.g. based on preference data indicating preference(s) and/or route(s) and/or drop-off(s) chosen in the past by the passenger. In one or more example systems, the route proposer 506 is configured to determine an operational metric of a route by combining a weight (associated with the attribute) with an operational cost associated with parts of that route. In other words, an operational metric of a route can be seen as an operational measure for a route towards a destination of the set in an operational dimension like price, energy, time-to-destination, walking distance, and/or accessibility etc. In other words, the operational metric of a route can be based on combining (e.g. applying, e.g. multiplying, as illustrated in FIG. 7C) a weight (associated with the attribute) with the operational metric corresponding to the attribute. For example, for a passenger that prefers to walk for a few minutes rather than wait in traffic, the preference data can include a first attribute indicating the walking preference and a second attribute indicative of traffic. For example, the route proposer 506 can determine a first operational metric indicative of walking time of a route by combining a first weight (associated with the first attribute) with a walking time metric associated with that route and a second operational metric indicative of traffic of the route by combining a second weight (associated with the second attribute) with a traffic metric associated with that route. For example, the first weight and the second weight may represent that the passenger prefers to walk for a few minutes rather than wait in traffic. In other words, the route proposer 506 can promote a route with traffic when the walking time metric indicates a few minutes walking time to destination. In other words, a route with a drop off providing a longer walking time may have a better score than a route with a shorter walking time but longer delay due to traffic.

In one or more example systems, the model is configured to determine, based on previous routes, the assignment of the weight to an attribute of the at least one attribute, e.g. of one or more attributes. For example, a passenger can be characterized by one or more attributes generated based on attributes of a plurality of passengers. For example, a passenger can be characterized by one or more attributes generated based on attributes for that specific passenger. The model can be based on a neural network model (as illustrated in FIG. 4B) to learn preference data, and to learn to assign weights to the attributes, e.g. based on preferences and routes/drop-offs chosen in the past. Alternatively and/or additional, the model can learn a whole operational metric, and/or cost function, e.g. enabling complex non-linear relationships. For example, the model is based on a user preference neural network.

In one or more example systems, the model is a user-specific model. A user-specific model can be seen as a model that characterizes and/or captures personal preferences of one user or one passenger. The user specific mode may be initialized with global model and fine-tuned using routes/destinations chosen by the passenger. In other words, the model can be a passenger-specific model, in that it characterizes a specific passenger, e.g. based on past routes for that passengers. The passenger-specific model can be configured to capture personal preferences of one passenger. The passenger-specific model can be initialized with a global model. The passenger-specific model can be fine-tuned using routes and/or a destination selected by the passenger such as via the user interface 512 coupled to the system 500. The system 500 can include a preference learner 510 configured to apply the model so as to learn about preferences of a passenger. The preference learner 510 can provide input to the preference data store 504 e.g. for obtaining and/or updating preference data for a passenger. The model can be a global model, in that it does not characterize a specific passenger. A global model can include a baseline for passenger-specific model. A global model can be used to set default preferences and weights for a new passenger. A global model can be trained to produce weights based on all preference data. The global model may be based on a convolutional neural network (as illustrated in FIG. 4B) providing convolutions over spatial map and/or time (e.g. passenger may prefer to walk less later at night or in certain neighborhoods). The global model may be based on supervised learning and/or unsupervised learning. For examples, passengers may be presented with the various routes provided by the system 500, and may select one route. An auditor can manually label the preference data learned by comparing the selection to the other routes presented The global model may be based on rules that perform comparisons automatically to auto-label the passenger's weights of the preference data.

In one or more example systems, for determining the set of routes, the system 500 is configured to determine, using the at least one processor, based on the weight, the corresponding operational metric across the at least one route. For example, the system 500, via the route proposer 506, determines, based on the weight, the corresponding operational metric for the route by performing a search in a graph, wherein the graph represents the road network. For example, the search is graph search, such as a search in a weighted graph having a weight applied to corresponding operational cost for a given edge of a graph, referred to as edge operational cost, as illustrated in FIG. 7B. An edge can connect two nodes in a graph. For example, a road network may be represented as a graph where edges are travel segments of the road, and nodes are e.g. intersections and/or road locations. For example, the system 500, via the route proposer 506, determines, based on the weight(s), the corresponding operational metric(s) for the route by obtaining the operational metric(s) for the route based on a sum of the weighted edge operational costs associated with the route.

For example, each edge of a graph can be associated with one or more edge operational costs and the operational metric of a route in the graph can involve a search in the graph by determining one or more operational metrics (e.g. time, energy consumption, traffic etc.) for the route, and applying one or more weights to the operational cost(s) for the route. The weighted graph can be a directed graph from initial location to destination.

Examples of graph searches include graph traversal search, and/or best-first search, such as A* search, and/or Dijkstra search. For example, the graph search can be an informed search, and/or a best-first search. For example, the graph search can start from initial location (which corresponds to a start node in the graph) and can aim to find a path to the given destination (which corresponds to a goal node in the graph) having the smallest operational metric (e.g. shortest time to destination, minimum energy consumption, lowest price, lowest traffic) and/or largest operational metric (e.g. most avoidance of crossing a street after drop-off, most accessibility metric). For example, the graph search can maintain a tree of paths originating at initial location (corresponding to the start node) and extending those paths one edge at a time until reaching destination or a termination criterion is satisfied.

In one or more example systems, the system 500 (such as route proposer 506) determines the set of routes by optimizing (such as minimizing or maximizing), using the at least one processor, across the at least one route, a cost function of weighted values of the one or more operational metrics associated with the at least one route. For example, the operational metric may be expressed as a cost function. A cost function may be seen as a function that associates values of one or more weights with one or more operational costs. The cost function may be a linear combination of the weights applied to operational costs (such as edge operational costs). Determining the set of routes can include maximizing an operational metric across the route, and/or minimizing an operational metric across the route, and/or optimizing, across the route, a cost function representative of the operational metric. For example, the operational metric may be expressed as a weighted combination of user preferences, e.g. a linear combination of weights applied to operational costs. For example, the operational metric may be expressed as a cost function, optionally learned from the model disclosed herein (e.g. user-specific model, such as a user preference neural network, and/or a global model). The cost function may be a linear combination of the weights applied to operational costs. For example, the set of routes can be determined, using the at least one processor, based on the one or more operational metrics across the at least one route. For example, the set of routes can be determined, using the at least one processor, based on the one or more operational metrics across each route of a plurality of routes towards the set of destination. Determining the set of routes can include determining one or more routes by maximizing across each route, a sum of weighted values of edge operational costs associated with each edge of the route and selecting one or more routes providing the largest operational metric.

In one or more example systems, the system 500 (such as route proposer 506) determines the set of routes by minimizing, using the at least one processor, across the at least one route, a cost function of weighted values of the one or more operational metrics associated with the at least one route. Determining the set of routes comprises determining one or more routes by minimizing across each route, a sum of weighted values of edge operational costs associated with each edges of the route and selecting one or more routes providing the lowest operational metric. The cost function may be a linear combination and/or machine learning-based cost function taking as input the operational edge costs and outputting the operational metric.

In one or more example systems, for determining the set of routes, the system 500, such as the route proposer 506, performs, using the at least one processor, a plurality of searches, in parallel, through a road network towards the set of destinations.

In one or more example systems, the plurality of searches comprises a first search based on a first operational metric and a second search based on a second operational metric different from the first operational metric. A search can be seen as a search for a route towards a destination of the set of destination, which is performed in the road network based on operational metrics of the route, as illustrated in FIG. 7C. For example, the plurality of searches can be performed for different operational metrics, such as different cost functions. In other words, parallel searches can be performed for operational metrics in different operational dimensions, such as time to destination, and walking time. Each search of the plurality of searches can be based on a different operational metric. This may be seen as a multi-goal and multi-cost exploration. For example, for a given destination (such as D1 of FIG. 7A, such as the user destination) of the set of destinations, a first search from the initial location can be performed to determine a first operational metric OP1 (such as an operational metric indicative of avoidance of crossing a street after drop off), and a second search can be performed to determine a second operational metric OP2 (such as an operational metric indicative of energy consumption) different from OP1. The plurality of searches are illustrated in FIG. 7C Exploration of the road network, e.g. via a graph search, can be balanced between different operational metrics (e.g. different cost functions) and/or goals (e.g. maximizing and/or minimizing and/or maintaining). A search can explore a single road network, but can switch between operational metrics (e.g. cost functions) to determine which routes to explore next. In one or more examples, the second operational metric has a target parameter indicative of goal diverging from a goal of the first operational metric, as illustrated in FIG. 7B. For example, for a given destination (e.g. illustrated as 701 in FIG. 7B) of the set of destinations, a first search from the initial location can be performed with a target parameter indicative of a goal to minimize a first operational metric OP1 (such as an operational metric indicative of energy consumption), and a second search can be performed with a target parameter indicative of a goal to maximize a second operational metric OP2 (such as an operational metric indicative of price). For example, a goal for OP2 diverges from the goal of OP1. By preferring the goal for OP2 that diverges from a goal of OP1 over other goals for OP2, the search can provide a divergent preference which encourages or configures a search to seek out alternate or additional routes that diverge from each other. For example, a divergence preference can be achieved by the system to explore and/or select graph nodes that have worse costs for other cost functions besides the one driving the search in that specific iteration. The disclosed technique can advantageously provide divergent routes to the route ranker 508 so that the set of routes output to the passenger can be varied. In other words, the search can be driven towards variation. For example, a search with a first operational metric (e.g. cost function) prefers routes with more expensive operational metrics (e.g. that other cost functions deem expensive).

In one or more example systems, the system 500 is configured to determine, using the at least one processor, based on the user destination and the preference data, an alternative destination. In one or more example systems, the set of destinations includes the alternative destination. In one or more example systems, the system 500 includes a destination estimator 502 configured to determine, based on the user destination and the preference data, an alternative destination and include the alternative destination in the set of destinations for which a set of routes is generated. For example, an alternative destination is seen as a destination different from the user destination. For example, an alternative destination can be determined based on the user destination. For example, an alternative destination includes a pickup and/or drop off area, PuDo area. For example, a passenger can request a user destination that is not the most optimal in view of the preference data and an operational metric, e.g. indicative of legality, to get to their target destination, e.g. the entrance of stadium. For example, for a stadium, the user address does not correspond usually to the main entry or the legal entry for accessing the stadium. For example, an airport has several terminals, and a user address of an airport is not sufficient to identify where to drop off the passenger. For example the alternative destination can be a PuDo that is close to the user destination physically but not the closest location in actual driving distance. The alternative destination may be seen as a destination estimated to match a passenger preference indicated in the preference data, e.g. where a passenger want to go and find a PuDo that may make the next travel leg easier.

The system 500 can be configured to determine an alternative destination based on the preference data. The preference data can indicate whether the user destination is not convenient or not optimal for a drop-off in view of the passenger preference(s). To assess based on the preference data whether the user destination is not convenient or not optimal for a drop-off in view of the passenger preference(s), the system can determine whether the user destination meets a criterion based on the preference data. For example, in response to the preference data indicating that the user destination is not convenient or not optimal for a drop-off, the system 500 determines an alternative destination. For example, in response to the user destination not meeting the criterion, the system 500 determines an alternative destination.

In one or more example systems, the system 500 (e.g. the destination estimator 502) determines the alternative destination by obtaining, using the at least one processor, feature data. In one or more example systems, the feature data includes one or more of: time data, user data, location data, and user selection data. Time data can indicate time of day, day of week, week of month, and/or month of year at the time of travelling. User data can include one or more of: age data, gender data, and disability data. Location data can include data indicative of one or more of: city block, and/or surrounding areas, etc. User selection data can indicate selections of routes of past passengers and/or other passengers and/or selections of past routes by the passenger.

In one or more example systems, the system 500 and/or destination estimator 502 determines the alternative destination by determining, using the at least one processor, based on the user destination, the preference data, and the feature data, the alternative destination. Stated differently, the destination estimator 502 can take as input the user destination, the preference data, and the feature data to determine the alternative destination. An update of the global data storage can be performed for correlating a destination with a PuDo and other features.

In one or more example systems, the system 500 and/or destination estimator 502 determines the alternative destination by determining, using the at least one processor, based on the user destination, the preference data, and a neural network model, the alternative destination. In one or more example systems, the neural network model is configured to estimate the alternative destination. For example, a neural network model as illustrated in FIG. 4B can be used to estimate the alternative destination based on the user destination and the preference data. For example the neural network mode is configured to estimate the alternative destination, e.g. based on past user behavior associated with a present passenger and/or other passengers. The estimated alternative destination can be associated with a likelihood parameter determined by the neural network model.

In one or more example systems, the system 500, and/or the route proposer 506, determines the set of routes by determining, using the at least one processor, based on the user destination, the preference data, and the alternative destination, a set of alternative routes. In one or more examples, the set of alternative routes include routes to an alternative destination. The set of routes can include the set of alternative routes.

In one or more example systems, the system 500 or the route proposer 506 determines the set of alternative routes by determining, using the at least one processor, based on the weight, the corresponding operational metric across at least one alternative route of the set of alternative routes. For example, the system 500 or the route proposer 506 determines, based on the weight, the corresponding operational metric across one or more alternative routes of the set of alternative routes. For example, the system 500 or the route proposer 506 determines, based on the weight, the corresponding operational metric across each alternative routes of the set of alternative routes to an alternative destination. For example, the system 500 or the route proposer 506 may repeat the determination of alternative route(s) for each alternative destination provided by the destination estimator 502.

In one or more example systems, the system 500 or the route proposer 506 determines the set of alternative routes by minimizing and/or maximizing, using the at least one processor, across the at least one alternative route, a cost function of weighted values of the one or more operational metrics associated with the at least one alternative route. For example, an alternative route may be determined by minimizing a cost function of weighted values of a first operational metric indicative of energy consumption and a second operational metric indicative of walking time to final destination (such as a restaurant door and/or a stadium entry point), where the preference data indicates and a second weight indicative of an attribute associated with the energy consumption a second weight associated with an attribute indicative of walking time. For example, the second weight can be larger than the first weight for a passenger with reduced mobility. The cost function can capture the preference through the weighted combination of the first operational metric and the second operational metric using the first and second weights.

In one or more example systems, the system 500 or the route proposer 506 determines the set of alternative routes by performing, using the at least one processor, a plurality of searches, in parallel, through a road network towards the set of alternative destinations.

In one or more example systems, the plurality of searches includes a third search based on a third operational metric and a fourth search based on a fourth operational metric different from the third operational metric. Multiple searches can be performed in parallel on the same graph representative of the road network with different operational metrics and/or cost functions. Multiple searches can be performed in series on the same graph representative of the road network with different operational metrics and/or cost functions. For example, the plurality of searches can be performed for different operational metrics, such as different cost functions. In other words, parallel searches can be performed for operational metrics in different operational dimensions, such as time to destination, and walking time. Each search of the plurality of searches can be based on a different operational metric. This may be seen as a multi-goal and multi-cost exploration. For example, for a given alternative destination (such as AltD1 of FIG. 7A), a third search from the initial location can be performed to determine a third operational metric OP3 (such as an operational metric indicative of avoidance of crossing a street after drop off), and a fourth search can be performed to determine a fourth operational metric OP4 (such as an operational metric indicative of energy consumption) different from OP3. Exploration of the road network, e.g. via a graph search, can be balanced between different operational metrics (e.g. different cost functions) and/or goals (e.g. maximizing and/or minimizing and/or maintaining). A search can explore a single road network, but can switch between operational metrics (e.g. cost functions) to determine which routes to explore next. In one or more examples, the fourth operational metric has a target parameter indicative of goal diverging from a goal of the third operational metric, as illustrated in FIG. 7B.

In one or more example systems, a target parameter of the fourth operational metric diverges from a target parameter of the third operational metric. A target parameter may be seen as a goal for an operational metric, such as a target for an operational metric, e.g. promoting, maximizing, minimizing, and/or maintaining an operational metric. For example, at least one search is configured to explore the road network by promoting an operational metric having a cost higher than the third operational metric and/or the second operational metric, e.g. by expanding the search based on an operational metric which has a higher cost than the operational metrics obtained for the set of routes (e.g. without alternative destinations). Different operational metrics (such as cost functions) can have different goals and a set of alternative routes to the collected goals (e.g. drop off location) can be determined.

In one or more example systems, the system 500 and/or the route ranker 508 ranks the routes of the set of routes by determining, using the at least one processor, based on common preference data, a first ranking of the routes of the set of routes. In one or more example systems, the common preference data is indicative of common preference types. A multi-cost hierarchical ranking for all routes found can be applied. First ranking is for each discrete set of common preference data, indicative of common preference types, such as price preference, time to destination preference and walking distance preference. Common preference types are preference types for a group of users, e.g. across a plurality of user, e.g. across all users. This can be illustrated in FIG. 7D.

In one or more example systems, the system 500 and/or the route ranker 508 ranks the routes of the set of routes by determining, using the at least one processor, based on the preference data, a second ranking of the routes of the set of routes. The second ranking for an overall route can be based on preference data indicative of all preferences. Preference data includes data indicative of preference regarding one or more of price, time to destination, but also includes traffic preferences and/or other learned preferences. Attributes can provide values weighted on learned user preference weights. Preference data indicative of the user preferences can determine the hierarchy of the multi-cost rankings. This can be illustrated in FIG. 7D.

In one or more example systems, the system 500 is configured to select, using the at least one processor, based on the preference data, a subset of highest ranked routes from the first ranking and the second ranking. For example, the system 500 selects the top k routes according to the preference data indicative of user route preferences, where k is a positive integer. The top k routes can include a top route for each of j predetermined common preference types (e.g. Price, Time to Destination, etc.) and top k-j other routes based on learned user preferences, where j is a positive integer. This is for example illustrated in FIG. 7D.

In one or more example systems, the system 500 is configured to select, using the at least one processor, based on the preference data, a highest ranked route for at least one alternative destination. For example, the top route according to learned user preferences for each of N alternative destinations is selected, where N is a positive integer. In one or more example systems, the system 500 is configured to provide a set of routes including N+k routes wherein k routes are according to preference data and N routes are according to alternative routes.

In one or more example systems, the system 500 is configured to cause, by the at least one processor, at least a portion of the ranked routes to be presented to a passenger. For example, the system 500 is configured to cause, by the at least one processor, at least a portion of the ranked routes to be presented to a passenger via a user interface, such as user interface 512 coupled with system 500. For example, the user interface 512 is a display device (e.g. a display device of the autonomous vehicle and/or a display device of a passenger device, such as a mobile device).

In one or more example systems, the system 500 is configured to receive, using the at least one processor, user input indicative of a selection of a route, e.g. amongst the ranked routes presented to the passenger. The user input can be provided via the user interface 512 in the form of a touch input on a user interface object representative of a ranked route, (such as any of the ranked routes illustrated in FIG. 7A). For example, the user interface object may be displayed on a touch sensitive display. The user input can be provided via the user interface 512 in form a user input via a button. A user interface object refers herein to a graphical representation of an object that is displayed on the display device. The user interface object may be user-interactive, or selectable by a user input. For example, an image (e.g., icon), a button, and text, each optionally constitute a user interface object. The user interface object can form part of a widget. A user interface object may comprise a prompt, application launch icon, and/or an action menu. A user input, such as first input and/or second input, may comprise a touch (e.g. a tap, a force touch, a long press), and/or movement of contact (e.g. a swipe gesture, e.g. for toggling). The movement on contact may be detected by a touch sensitive surface, e.g. on a display device.

In one or more example systems, the control of the navigation of the autonomous vehicle by the system 500 includes control, using the at least one processor, based on the user input, of the navigation of the autonomous vehicle. In other words, the system 500 can use the selected route to plan and control the navigation of the AV. In other words, the system 500 can, e.g. via the planning system 514, generate, based on the selected route, navigation data for control of the navigation of the AV. The navigation data can be processed by a control system of the AV, such as control system 408 of FIG. 4A.

In one or more example systems, the system 500 includes a drop off tracker 516 configured to monitor the passenger after drop-off, such as to monitor the passenger movement after drop off, such as the navigation of the passenger to final destination after drop off, such as to a main entrance. The drop off tracker 516 may obtain input from the planning system 514 as to the set of destinations, and may provide data to the preference learner 510 so as to learn from the passenger post-drop off behavior.

It is to be noted that the operations of the route proposer (e.g. route proposer 506) and operations of the route ranker (e.g. route ranker 508) can be performed in parallel, which can optimize the search by eliminating solutions guaranteed to be excluded from final set of routes.

Figure 6:
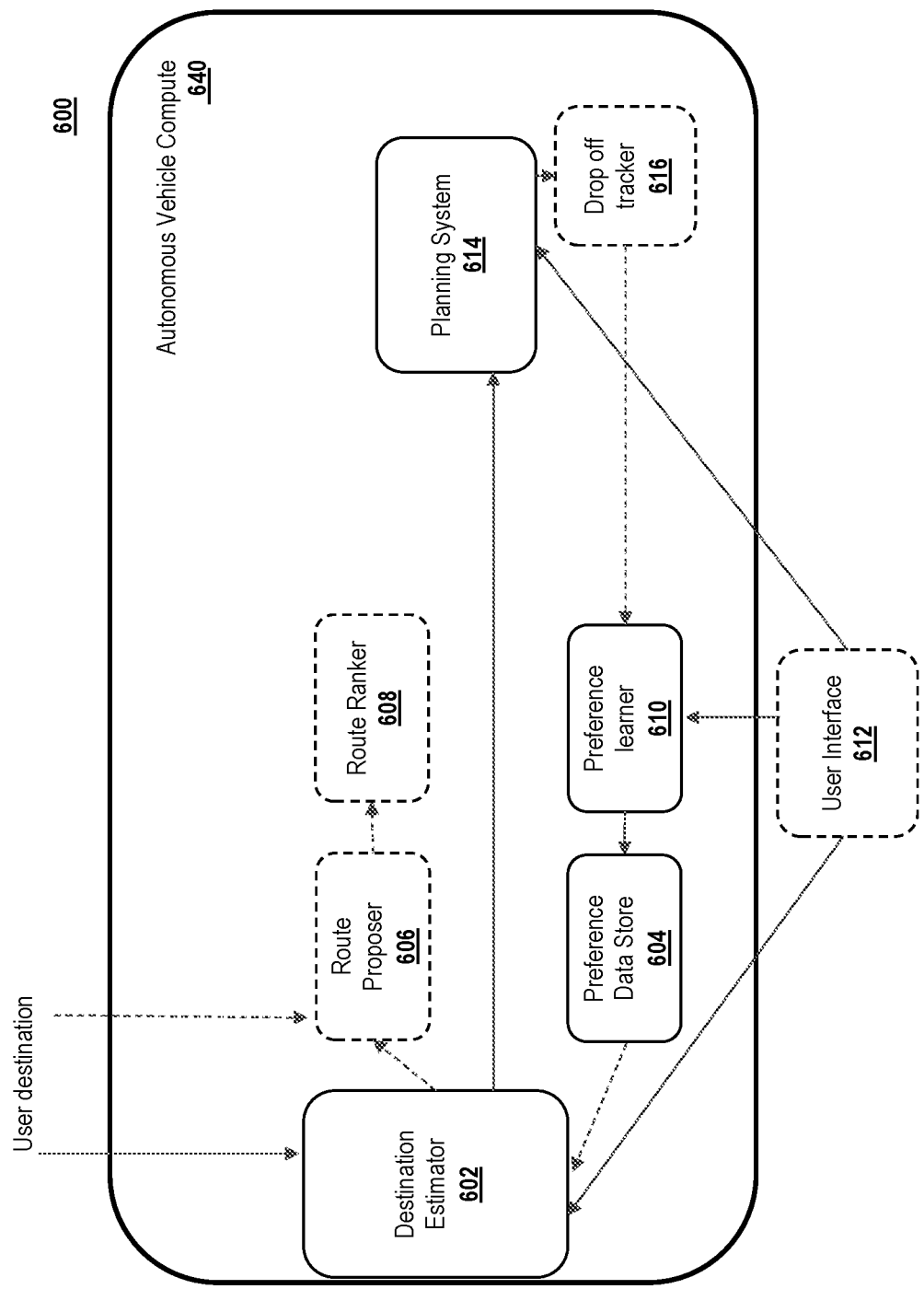
FIG. 6 is a diagram of an example implementation of a process for providing an alternative route.

Referring now to FIG. 6, illustrated are diagrams of an implementation of a system 600 for obtaining alternative routes. In some embodiments, system 600 includes an AV compute 640, and a vehicle (similar to vehicle 200 of FIG. 2, such as an autonomous vehicle). In some embodiments, system 600 is the same autonomous system as or like system, such as an AV (e.g. illustrated in FIGS. 2, 4A, 5), an AV system, a remote AV system, a fleet management system, a device (e.g. illustrated in FIG. 3) and a V2I system. The system 600 can be for operating an autonomous vehicle. The system 600 may not be for operating an autonomous vehicle.

In one or more example systems, the system 600 includes at least one processor. In one or more example systems, the system 600 includes at least one non-transitory computer readable medium storing instructions that, when executed by the at least one processor, cause the at least one processor to perform operations including obtaining, using the at least one processor, a user destination. In one or more example systems, the operations include obtaining, using the at least one processor, preference data indicative of a user route preference. In one or more example systems, the operations include determining, using the at least one processor, based on the user destination and the preference data, an alternative destination. In one or more example systems, the operations include controlling, using the at least one processor, based on the alternative destination, navigation of an autonomous vehicle.

The system 600 can provide, to the passenger and/or to a service, alternative destination(s) for drop off and alternative routes that may impact one or more of: a time to destination, distance travelled, post drop off walking distance, and price, which may match one or more preferences of the passenger. For example, the system 600 can determine, based on the preference data, alternative destinations which may be easier to access. The system 600 includes for example a destination estimator 602 configured to provide an alternative destination based on one or more of: a user destination and a preference data.

In one or more example systems, the system 600 and/or the destination estimator 602 obtains, using the at least one processor, a user destination. The user destination can be seen as a destination provided by user input, optionally via a ride service. The user destination can be provided by a ride service. The user destination can be a target destination, such as a requested destination, optionally provided via a user input from the passenger. The user destination can be one or more of: a geographic location, a point of interest, a landmark, and/or an area.

In one or more example systems, the system 600 and/or the destination estimator 602 is configured to obtain, using the at least one processor, preference data indicative of a user route preference. For example, the system 600 is configured to receive and/or retrieve preference data from a user preference database or from a preference data store, such as preference data store 604, such as a user preference store. The preference data may be seen as data representative of one or more user route preferences, such as user preferences regarding route and/or drop off. A user route preference may be seen as a preference of a user, such as a preference of a passenger regarding a route and/or travel and/or a type of destination and/or a context of destination area (such as PuDo, parking lot, etc.) and/or drop off. A user route preference can be seen as a user preference, e.g. in terms of time-to-destination, price, walking time, accessibility, legality, and/or energy consumption. The preference data can include user data, such as user profile data. The user data may include passenger data indicative of one or more of: age, gender, status, and/or disability status.

In one or more example systems, the preference data comprises one or more attributes indicative of the user route preference. For example, for time-to-destination, an attribute can indicate a user preference for being early at the user destination. For example, for price, an attribute can indicate a user preference for minimizing price. For example, for walking time, an attribute can indicate a user preference providing a walking distance threshold. For example, for accessibility and/or legality considerations, an attribute can indicate a user preference for avoiding crossing a street after drop-off. For example, for traffic, an attribute can indicate a user preference for avoiding traffic (e.g. minimizing). For example, for energy consumption and/or gas emission an attribute can indicate a user preference for minimizing the energy consumption and/or gas emission. In one or more examples, preference data can include historic and/or previous preference data. Previous preference data can be based on preference(s) and/or route(s) and/or drop-off(s) chosen and/or observed in the past. A passenger can optionally configure preferences at a high level, thereby resulting in corresponding preference data. For example, independent attributes, e.g. cost, walking distance, time, can be configured by the passenger, with various level of importance, e.g. "not important", "somewhat important", "very important", "highest priority". This may lead to weight(s) given to an attribute based on its corresponding level of importance. In one or more example systems, the attribute(s) can be configured by the passenger via a user interface, such as user interface 612, such as a user interface provided on a device of the passenger, which transmits the attribute(s) to the system 600. The user interface 612 can be similar to user interface 512 in one or more examples. The user route preferences can vary: for example Alice prefers to walk for a few minutes rather than wait in traffic; Bob wants to be dropped as close to his final destination as possible; Eve would like as cheap a ride as possible without walking more than 1 mile. The disclosed preference data can characterize the user routes preferences via attributes.

In one or more example systems, the system 600 and/or the destination estimator 603 determines, based on the user destination and the preference data, the alternative destination. The alternative destination may be provided by the destination estimator 602 to a route proposer 606 and/or a route ranker 608. Route proposer 606 can be similar to route proposer 506 of FIG. 5. Route ranker 608 can be similar to route ranker 508 of FIG. 5. It is to be noted that the operations of the route proposer (e.g. route proposer 606) and operations of the route ranker (e.g. route ranker 608) can be performed in parallel, which can optimize the search by eliminating solutions guaranteed to be excluded from final set of routes. The system 600 can be configured to determine an alternative destination based on the preference data. The preference data can indicate whether the user destination is not convenient or not optimal for a drop-off in view of the passenger preference(s). To assess based on the preference data whether the user destination is not convenient or not optimal for a drop-off in view of the passenger preference(s), the system can determine whether the user destination meets a criterion based on the preference data. For example, in response to the preference data indicating that the user destination is not convenient or not optimal for a drop-off, the system 600 determines an alternative destination. For example, in response to the user destination not meeting the criterion, the system 600 determines an alternative destination.

In one or more example systems, the system 600 and/or the destination estimator 603 determines the alternative destination by obtaining, using the at least one processor, feature data. In one or more example systems, the feature data comprises one or more of: time data, user data, location data, and user selection data. Time data can indicate time of day, day of week, week of month, and/or month of year at the time of travelling. User data can include one or more of: age data, gender data, and disability data. Location data can include data indicative of one or more of: city block, and/or surrounding areas, etc. User selection data can indicate selections of routes of past passengers and/or other passengers and/or selections of past routes by the passenger.

In one or more example systems, the system 600 or destination estimator 602 determines the alternative destination by determining, using the at least one processor, based on the user destination, the preference data, and the feature data, the alternative destination. Stated differently, the destination estimator 602 can take as input the user destination, the preference data, and the feature data to determine the alternative destination. An update of the global data storage can be performed for correlating a destination with a PuDo and other features.

In one or more example systems, the system 600 and/or destination estimator 602 determines the alternative destination by determining, using the at least one processor, based on the user destination, the preference data, and a neural network model, the alternative destination. In one or more example systems, the neural network model is configured to estimate the alternative destination. For example, a neural network model as illustrated in FIG. 4B can be used to estimate the alternative destination based on the user destination and the preference data. For example the neural network mode is configured to estimate the alternative destination, e.g. based on past user behavior associated with a present passenger and/or other passengers. The estimated alternative destination can be associated with a likelihood parameter determined by the neural network model.

In one or more example systems, the system 600 is configured to determine, using the at least one processor, based on the user destination and the preference data, an alternative destination. For example, the destination estimator 602 determines, based on the user destination and the preference data, an alternative destination. The alternative destination may be seen as a destination different from and/or alternative to the user destination.

In one or more example systems, the system 600 is configured to control, using the at least one processor, based on the alternative destination, navigation of an autonomous vehicle. For example, the system 600 includes a planning system 614 configured to provide navigation data to a control system of the AV. For example, the planning system 614 obtains the alternative destination from the destination estimator 602 and control the navigation accordingly, e.g. by generating navigation data based on the alternative destination. In one or more example systems, the system 600 is configured to navigate according to the alternative destination.

In one or more example systems, the system 600 is configured to cause, by the at least one processor, the alternative destination to be presented to a passenger. For example, the system 600 is configured to cause, by the at least one processor, at least a portion of the ranked routes to be presented to a passenger via a user interface, such as user interface 612 coupled with system 600. For example, the user interface 612 can be part of a display device (e.g. a display device of the autonomous vehicle and/or a display device of a passenger device, such as a mobile device).

In one or more example systems, the system 600 is configured to receive, using the at least one processor, user input indicative of a selection of the alternative destination. The user input can be provided via the user interface 612 in form a touch input on a user interface object representative of an alternative destination. For example, the user interface object may be displayed on a touch sensitive display. The user input can be provided via the user interface 612 in form a user input via a button. A user interface object refers herein to a graphical representation of an object that is displayed on the display device. The user interface object may be user-interactive, or selectable by a user input. For example, an image (e.g., icon), a button, and text, each optionally constitute a user interface object. The user interface object can form part of a widget. A user interface object may comprise a prompt, application launch icon, and/or an action menu. A user input, such as first input and/or second input, may comprise a touch (e.g. a tap, a force touch, a long press), and/or movement of contact (e.g. a swipe gesture, e.g. for toggling). The movement on contact may be detected by a touch sensitive surface, e.g. on a display device.

In one or more example systems, the system 600 can, via the planning system 614, control, the navigation of the autonomous vehicle by controlling, using the at least one processor, based on the user input, the navigation of the autonomous vehicle. In other words, the system 600 can use the selected alternative destination to plan and control the navigation of the AV. In other words, the system 500 can, e.g. via the planning system 514, generate, based on the selected route, navigation data for control of the navigation of the AV. The navigation data can be processed by a control system of the AV, such as control system 408 of FIG. 4.

In one or more example systems, the system 600 includes a drop off tracker 616 configured to monitor the passenger after drop-off, such as to monitor the passenger movement after drop off, such as the navigation of the passenger to final destination after drop off, such as to a main entrance. The drop off tracker 616 may obtain input from the planning system 614 as to the set of destinations, and may provide data to the preference learner 610 so as to learn from the passenger post-drop off behavior, which can improve the determination of the alternative destination by the destination estimator 602.

Referring now to FIG. 7A, illustrated is a representation of an example user interface screen 700. The user interface screen 700 includes, for example, a first user interface object representative of a user destination D1 and a first route 1, a second user interface object representative of a user destination D1 and a second route 2, a third user interface object representative of a user destination D1 and a third route 3. The routes are ranked, based on preference data, from the most preferred to the least preferred: route 1, route 2, route 3

The user interface screen 700 includes for example a fourth user interface object representative of a first alternative destination AltD1 and a first operational metric OP1, a fifth user interface object representative of a second alternative destination AltD2 and a second operational metric OP2. For example, AltD1 may be an alternative destination providing a faster travel time than the user destination D1.

Referring now to FIG. 7B, illustrated is a representation of an example of alternative destinations in a road network. For example, a user destination is illustrated as 701, which can be seen as a common final destination. Destination 702 illustrates a first alternative destination determined by the disclosed systems and/or the disclosed methods. Destination 703 illustrates a second alternative destination, such as near a PuDo 705 determined by the disclosed systems and/or the disclosed methods. The disclosed systems and/or disclosed methods select, for example, the first alternative destination 702 as the disclosed systems and/or disclosed methods determine that the first alternative destination to be closer to the user destination, thereby providing an operational metric, e.g. for walking time that is lower than for 703.

Referring now to FIG. 7C, illustrated is a representation of an example graph 710, that can be used by the disclosed systems and the disclosed methods to determine a set of routes. Graph 710 is representative of a road network. Graph 710 includes nodes and edges. For example, a node of graph 710 may represent a location, such as an intersection, and/or a road location of a road network. Node A is the origin node, such as an origin location. Edges of the graph 710 can be associated with one or more operational costs affecting the one or more corresponding operational metrics of a route. For example, OP1_AB, OP2_AB, OP3_AB for route from A to B are affected by the operational costs OPC1, OPC2, OPC3 respectively. The operational costs can also be called edge operational costs. The graph search disclosed herein (performed by the disclosed system and/or method) may start at node A where the operational metrics, such as OP1_A, OP2_A, OP3_A, are initialized to zero. In other words, at origin, e.g. origin node A, the operational metric is zero. For example, the first operational metric OP1 may be indicative of one or more of: price, time-to-destination, walking time to final destination, a traffic, energy consumption, disability access, legality, and avoidance of crossing the street after drop off. For example, the second operational metric OP2 may be indicative of one or more of: price, time-to-destination, walking time to final destination, a traffic, energy consumption, disability access, legality, and avoidance of crossing the street after drop off. For example, the third operational metric OP3 may be indicative of one or more of: price, time-to-destination, walking time to final destination, a traffic, energy consumption, disability access, legality, and avoidance of crossing the street after drop off. OP1 may be of a type different from OP2 and/or OP3 in one or more examples. OP2 may be of a type different from OP3 and/or OP1 in one or more examples. OP3 may be of a type different from OP2 and/or OP1 in one or more examples. There may exist an order or hierarchy between OP1, OP2 and OP3. The order and/or hierarchy between the operational metrics may be arbitrary. For example, in FIG. 7C, OP1 has a higher order than OP2, which has a higher order than OP3. For example, at node G, the search (performed by the disclosed system and/or method) can first expand on OP1, and select the next node providing the highest value for OP1, which is node H. For example, at node B, the search (performed by the disclosed system and/or method) can expand on OP2, and select the next node providing the highest value for OP2, which is node C. For example, at node H, the search (performed by the disclosed system and/or method) can expand on OP3, and select the next node providing the highest value for OP3. For example, at node C, the search (performed by the disclosed system and/or method) can expand on OP1, and select the next node providing the highest value for OP1.

When the search (performed by the disclosed system and/or method) explores and/or determines a route via B, the operational metrics such as OP1_AB, OP2_AB, OP3_AB for route from A to B are determined by applying weights a1, a2, a3 (associated with attributes of the preference data) to the operational costs OPC1, OPC2, OPC3 for edge connecting A to B. For example, the weights are applied (by the disclosed system and/or method) in the following manner e.g.:

$$OP1\_AB = a1 \times OPC1$$

$$OP2\_AB = a2 \times OPC2$$

$$OP3\_AB = a3 \times OPC3.$$

In the example of FIG. 7C, a1=1, a2=2, a3=1. A total aggregate operational metric T may be determined as:

$$T = b1 \times OP1\_AB + b2 \times OP2\_AB + b3 \times OP3\_AB,$$

where b1, b2, b3 may be weights associated with attributes of the preference data related to OP1, OP2 and OP3 respectively.

The search (performed by the disclosed system and/or method) expands on OP2 and OP3 (different from OP1), in that it promotes OP2 and OP3. The search (performed by the disclosed system and/or method) determines OP2_ABC, OP3_ABC, OP2_AGI, OP3_AGI. As illustrated, OP2_AGI is lower than OP2_ABC and OP3_AGI is lower than OP3_ABC.

In one or more examples or embodiments, to increase variation, the search performed by the disclosed system expands and selects routes with operational metrics different from OP1 of route AB and which may provide the highest value on the next edge. In other words, the search prefers routes that other cost functions that previously selected deem expensive. Stated differently, the search can prefer a node because other cost functions are unlikely to expand it, thereby encouraging exploration. Thus the search selects the path ABC as a route part of the set of routes.

For variation, the search may proceed to divergent target parameter indicative of a diverging goal of the operational metric. This encourages exploration. Goals can be collected via the target parameter and provided in the set of routes. For example, path AGI can be added as a route to the set of routes. In other words, path AGI can be seen as a route which increases diversity.

Referring now to FIG. 7D, illustrated is a representation 720 of an example ranking of at least a part of the routes of the set routes determined by the disclosed systems and/or the disclosed methods. The representation 720 can include a first data structure 721 for the set of routes for a user destination and optionally a second data structure 722 for an alternative destination AltD1 and optionally a third data structure 723 for alternative destination AltD2. A data structure can be seen as a bin, and/or a buffer. The data structures 721, 722, 723 include for each route: a total aggregate operational metric T (which is, e.g. an aggregate of the operational metrics), a first operational metric OP1, and a second operational metric OP2. For example, OP1 can represent time-to-destination and OP2 can represent accessibility. For example, for a passenger preferring a better accessibility over a shorter time-to-destination due to a disability, the preference data may indicate attributes providing a first weight b1 to OP1 and a second weight b2 to OP2, wherein the second weight is larger than the first weight. The total aggregate operational metric T can be expressed as: $T = b1 \times OP1 + b2 \times OP2$.

For example, the disclosed systems and/or the disclosed methods select the top k routes according to the preference data indicative of user route preferences, where k is a positive integer (k=3 in the example of FIG. 7D). The top k routes can include a top route for each of j operational metric corresponding to predetermined common preference types (e.g. Price, Time to Destination, etc.) and top k-j other routes based on learned user preferences, where j is a positive integer (j=1 to refer to OP1 in the illustrated example of FIG. 7D). For example, operational metric OP1 is indicative of price, and the preference data indicates an attribute that gives a larger weight to minimize price. The ranking may be seen as a first ranking which is performed based on OP1 as illustrated in FIG. 7D. The lowest OP1 is given, by the route ranker, the highest rank, thereby route 731 is selected because OP1=3, which is the lowest value about the OP1 of routes 731, 732, 733, 734, and 735. This is despite the total aggregated operational metric T being 21 for route 731.

The route ranker can then select routes 732 and 733 because the routes are estimated to provide the two lowest total aggregated operational metrics T. This may correspond to the second ranking disclosed herein performed based on T, as illustrated in FIG. 7D.

For example, the disclosed systems and/or the disclosed methods select, based on the preference data, a highest ranked route for at least one alternative destination such as AltD1, AltD2. For example, the top route according to learned user preferences for each of N alternative destinations is selected, where N is an integer (N=2 in the illustrated example of FIG. 7D). For alternative destinations, the total aggregate operational metric is used to select the alternative routes amongst the alternative routes 741, 742, 743, 744. For example, route 741 and 743 are estimated to provide the lowest T and are thereby the highest ranked routes for alternative routes. The route ranker provides a set 750 of routes including N+k routes, e.g. 2+3=5 routes, namely routes 731, 732, 741 and 743 are provided. For example, k routes are according to preference data and N routes are according to alternative routes. The set 750 of ranked routes is provided by the route ranker Referring now to FIG. 8, illustrated is a flowchart of a method or process 800 for generating passenger preference route, e.g. for controlling navigation of an autonomous vehicle, AV, such as for operating and/or controlling an AV. The method can be performed by a system disclosed herein, such as an AV compute 400, and/or a vehicle 102, 200, device 300 of FIGS. 1, 2, 3, 4A and/or AV compute 540 of FIG. 5, and/or AV compute 640 of FIG. 6 and implementations of FIGS. 7A-7D. The system disclosed includes at least one processor which can be configured to carry out one or more of the operations of method 800. The method 800 can be performed (e.g., completely, partially, and/or the like) by another device or group of devices separate from or including system disclosed herein.

In one or more example methods, the method 800 includes obtaining, at step 802, using at least one processor, a user destination. The user destination can be seen as a destination provided by user input, optionally via a ride service. The user destination can be provided by a ride service. The user destination can be a target destination, such as a requested destination, optionally provided via a user input from the passenger. The user destination can be one or more of: a geographic location, a point of interest, a landmark, and/or an area.

In one or more example methods, the method 800 includes obtaining, at step 804 using the at least one processor, preference data indicative of a user route preference. For example, obtaining, at step 804, using the at least one processor, preference data includes receiving and/or retrieving the preference data from a user preference database or from a preference data store, such as preference data store of FIG. 5, such as a user preference store. The preference data may be seen as data representative of one or more user route preferences. A user route preference may be seen as a preference of a user, such as a preference of a passenger regarding a route and/or travel and/or a destination. A user route preference can be seen as a user preference, e.g. in terms of time-to-destination, price, walking time, accessibility, legality, and/or energy consumption. The preference data can include user data, such as user profile data. The user data may include passenger data indicative of one or more of: age, gender, status, and/or disability status. In one or more example systems, the preference data comprises one or more attributes indicative of the user route preference. For example, for time-to-destination, an attribute can indicate a user preference for being early at the user destination. For example, for price, an attribute can indicate a user preference for minimizing price. For example, for walking time, an attribute can indicate a user preference providing a walking distance threshold. For example, for accessibility and/or legality considerations, an attribute can indicate a user preference for avoiding crossing a street after drop-off. For example, for traffic, an attribute can indicate a user preference for avoiding traffic (e.g. minimizing). For example, for energy consumption and/or gas emission an attribute can indicate a user preference for minimizing the energy consumption and/or gas emission. In one or more examples, preference data can include historic and/or previous preference data. Previous preference data can be based on preference(s) and/or route(s) and/or drop-off(s) chosen and/or observed in the past. A passenger can optionally configure preferences at a high level, thereby resulting in corresponding preference data. For example, independent attributes, e.g. cost, walking distance, time, can be configured by the passenger, with various level of importance, e.g. "not important", "somewhat important", "very important", "highest priority". This may lead to weight(s) given to an attribute based on its corresponding level of importance. In one or more example systems, the attribute(s) can be configured by the passenger via a user interface, such as user interface, such as a user interface provided on a device of the passenger, which transmits the attribute(s) to the system. The user route preferences can vary: for example Alice prefers to walk for a few minutes rather than wait in traffic; Bob wants to be dropped as close to his final destination as possible; Eve would like as cheap a ride as possible without walking more than 1 mile. The disclosed preference data can characterize the user routes preferences via attributes.

In one or more example methods, the method 800 includes determining, at step 806, using the at least one processor, based on the user destination and the preference data, a set of routes towards a set of destinations. In one or more example methods, at least one route of the set of routes is associated with one or more operational metrics. For example, each route can be associated with one or more operational metrics. Stated differently, a route may be associated with a first operational metric indicative of price, and optionally a second operational metric indicative of time-to-destination, and optionally a third operational metric indicative of walking time to final destination, and optionally a fourth operational metric indicative of traffic, and optionally a fifth operational metric indicative of energy consumption. A set of routes can be determined, by the route proposed, towards a set of destination. For example the set of routes can be seen as a set of routes towards a same set of destinations. The set of destinations can include the user destination, and/or alternative destination(s) determined based on the user destination, such as in proximity to the user destination. In other words, a route proposer can determine, using the at least one processor, based on the user destination and the preference data, the set of routes towards the set of destinations. In other words, the route proposer can take as input the preference data (e.g. indicative of learned route preference and/or past route preferences) and can, based on the input, generate a set of routes with associated operational metric(s) (such as total associated operational metric for each route, each operational metric for a given operational dimension, as illustrated in FIG. 7D).

In one or more example methods, the method 800 includes ranking, at step 808, using the at least one processor, based on the preference data, the routes of the set of routes. For example, the routes of the set of routes can be ranked, e.g. from the most preferred to the least preferred route based on the preference data. For example, a part of the routes of the set of routes can be ranked. In other words, ranking can include prioritizing and/or ordering at least a part of the routes of the set of routes based on the preference data. For example, the preference data can indicate that the passenger prefers to avoid crossing the street after drop-off, the method ranks at least a part of the routes of the set of routes based on avoidance of street crossing after drop-off. The method can obtain preference data from a preference data store and the set of routes with associated operational metric(s) from the route proposer.

In one or more example methods, the method 800 includes controlling, at step 810, using the at least one processor, based on at least one of the ranked routes, navigation of an autonomous vehicle. For example, controlling at step 810 includes obtaining at least one of the ranked routes from the route ranker 508 and controlling the navigation accordingly, e.g. by generating navigation data based on the at least one ranked route. In one or more example methods, the method 800 includes navigating according to the at least one of the ranked routes In one or more example methods, obtaining, at step 804, using the at least one processor, the preference data includes assigning, based on a model, a weight to at least one attribute of the one or more attributes for a corresponding operational metric of the one or more operational metrics. For example, the method can assign, based on a model, a weight to at least one attribute of the one or more attributes for a corresponding operational metric of the one or more operational metrics. In one or more examples, the model is a global model that can learn to assign weights to the attributes, e.g. based on preference data indicating preference(s) and/or route(s) and/or drop-off(s) chosen in the past by the passenger. In one or more example methods, obtaining, at step 804, includes determining an operation metric of a route by combining a weight (associated with the attribute) with an operational cost associated with parts of that route (such as an edge operational cost of an edge in a graph). In other words, an operational metric of a route can be seen as an operational measure for a route towards a destination of the set in an operational dimension like price, energy, time-to-destination, walking distance, and/or accessibility etc. In other words, the operational metric of a route can be based on combining a weight (associated with the attribute) with the operational metric corresponding to the attribute.

In one or more example methods, the model is configured to determine, based on previous routes, the assignment of the weight to an attribute of the at least one attribute. For example, a passenger can be characterized by one or more attributes generated based on attributes of a plurality of passengers. For example, a passenger can be characterized by one or more attributes generated based on attributes for that specific passenger. The model can be based on a neural network model (as illustrated in FIG. 4B) to learn preference data, and to learn to assign weights to the attributes, e.g. based on preferences and routes/drop-offs chosen in the past. For example, the route ranker 508 and/or the route proposer 506 can use the weights to combine features into costs. Alternatively and/or additional, the model can learn a whole operational metric, and/or cost function, e.g. enabling complex non-linear relationships. For example, the model is based on a user preference neural network.

In one or more example methods, the model is a user-specific model. A user-specific model can be seen as a model that characterizes and/or captures personal preferences of one user or one passenger. The user specific mode may be initialized with global model and fine-tuned using routes/destinations chosen by the passenger. In other words, the model can be a passenger-specific model, in that it characterizes a specific passenger, e.g. based on past routes for that passengers. The passenger-specific model can be configured to capture personal preferences of one passenger. The passenger-specific model can be initialized with a global model. The passenger-specific model can be fine-tuned using routes and/or destination selected by the passenger such as via a user interface coupled to the system disclosed herein. The method 800 may use a preference learner configured to apply the model so as to learn about preferences of a passenger. The preference learner can provide input to the preference data store e.g. for obtaining and/or updating preference data for a passenger. The model can be a global model, in that it does not characterize a specific passenger.

In one or more example methods, determining, at step 806 the set of routes includes determining, using the at least one processor, based on the weight, the corresponding operational metric across the at least one route. For example, determining, based on the weight, the corresponding operational metric for the route includes performing a search in a graph, wherein the graph represents the road network. For example, the search is graph search, such as a search in a weighted graph having a weight applied to corresponding operational cost for a given edge, referred to as edge operational cost, as illustrated in FIG. 7B.

Determining at step 806 the set of routes can include maximizing an operational metric across the route, and/or minimizing an operational metric across the route, and/or optimizing, across the route, a cost function representative of the operational metric. For example, the operational metric may be expressed as a weighted combination of user preferences, e.g. a linear combination of weights applied to operational costs. For example, the operational metric may be expressed as a cost function, optionally learned from the disclosed model (e.g. user-specific model, such as a user preference neural network, and/or a global model). The cost function may be a linear combination of the weights applied to operational costs. For example, the set of routes can be determined, using the at least one processor, based on the one or more operational metrics across the at least one route. For example, the set of routes can be determined, using the at least one processor, based on the one or more operational metrics across each route of a plurality of routes towards the set of destination. Determining at step 806 the set of routes can include determining one or more routes by maximizing across each route, a sum of weighted values of edge operational costs associated with each edge of the route and selecting one or more routes providing the largest operational metric.

In one or more example methods, determining at step 806 the set of routes includes minimizing, using the at least one processor, across the at least one route, a cost function of weighted values of the one or more operational metrics associated with the at least one route. Determining the set of routes comprises determining one or more routes by minimizing across each route, a sum of weighted values of edge operational costs associated with each edges of the route and selecting one or more routes providing the lowest operational metric. The cost function may be a linear combination and/or machine learning-based cost function taking as input the operational edge costs and outputting the operational metric.

In one or more example methods, determining at step 806 the set of routes includes performing, using the at least one processor, a plurality of searches, in parallel, through a road network towards the set of destinations. In one or more example methods, the plurality of searches includes a first search based on a first operational metric and a second search based on a second operational metric different from the first operational metric. For example, the plurality of searches can be performed for different operational metrics, such as different cost functions. In other words, parallel searches can be performed for operational metrics in different operational dimensions, such as time to destination, and walking time. Each search of the plurality of searches can be based on a different operational metric. This may be seen as a multi-goal, and multi-cost exploration. For example, for a given destination D1 of the set of destinations, a first search from the initial location can be performed to determine a first operational metric OP1 (such as an operational metric indicative of avoidance of crossing a street after drop off), and a second search can be performed to determine a second operational metric OP2 (such as an operational metric indicative of energy consumption) different from OP1. For example, an alternative destination is seen as a destination different from the user destination. For example, an alternative destination can be determined based on the user destination. For example, an alternative destination includes a pickup and/or drop off area, PuDo area. For example, a passenger can request a user destination that is not the most optimal in view of an operational metric, e.g. indicative of legality, to get to their target destination, e.g. the entrance of stadium. For example, for a stadium, the address is not main entry or the legal entry. For example, an airport has several terminal. For example the alternative destination can be a PuDo that is close to the user destination physically but not the closest location in actual driving distance. The alternative destination may be seen as a destination estimated to match where a passenger want to go and find a PuDo that may make the last travel leg easier.

In one or more example methods, the method 800 includes determining, using the at least one processor, based on the user destination and the preference data, an alternative destination. In one or more example methods, the set of destinations includes the alternative destination. In one or more example methods, the set of destinations includes the alternative destination. For example, an alternative destination is seen as a destination different from the user destination. For example, an alternative destination can be determined based on the user destination. For example, an alternative destination includes a pickup and/or drop off area, PuDo area. For example, a passenger can request a user destination that is not the most optimal in view of an operational metric, e.g. indicative of legality, to get to their target destination, e.g. the entrance of stadium. For example, for a stadium, the address is not main entry or the legal entry. For example, an airport has several terminal. For example the alternative destination can be a PuDo that is close to the user destination physically but not the closest location in actual driving distance. The alternative destination may be seen as a destination estimated to match where a passenger want to go and find a PuDo that may make the last travel leg easier.

In one or more example methods, determining the alternative destination includes obtaining, using the at least one processor, feature data.

In one or more example methods, the feature data comprises one or more of: time data, user data, location data, and user selection data. In one or more example methods, the feature data includes one or more of: time data, user data, location data, and user selection data. Time data can indicate time of day, day of week, week of month, month of year at the time of travelling. User data can include one or more of: age data, gender data, disability data. Location data can include data indicative of one or more of: city block, and/or surrounding areas, etc. User selection data can indicate selections of routes of past passengers and/or other passengers and/or selections of past routes by the passenger.

In one or more example methods, determining the alternative destination includes determining, using the at least one processor, based on the user destination, the preference data, and the feature data, the alternative destination. Stated differently, the method 800 can take as input the user destination, the preference data, and the feature data to determine the alternative destination. An update of the global data storage can be performed for correlating a destination with a PuDo and other features.

In one or more example methods, determining the alternative destination includes determining, using the at least one processor, based on the user destination, the preference data, and a neural network model, the alternative destination. In one or more example methods, the neural network model is configured to estimate the alternative destination. For example, a neural network model as illustrated in FIG. 4B can be used to estimate the alternative destination based on the user destination and the preference data. For example, the neural network mode is configured to estimate the alternative destination, e.g. based on past user behavior associated with a present passenger and/or other passengers. The estimated alternative destination can be associated with a likelihood parameter determined by the neural network model.

In one or more example methods, determining the set of routes includes determining, using the at least one processor, based on the user destination, the preference data, and the alternative destination, a set of alternative routes. In one or more examples, the set of alternative routes include routes to an alternative destination. The set of routes can include the set of alternative routes.

In one or more example methods, determining the set of alternative routes includes determining, using the at least one processor, based on the weight, the corresponding operational metric across at least one alternative route of the set of alternative routes. For example, the method 800 determines, based on the weight, the corresponding operational metric across one or more alternative routes of the set of alternative routes. For example, the method 800 determines, based on the weight, the corresponding operational metric across each alternative routes of the set of alternative routes to an alternative destination. For example, the method 800 may repeat the determination of alternative route(s) for each alternative destination provided.

In one or more example methods, determining the set of alternative routes includes minimizing, using the at least one processor, across the at least one alternative route, a cost function of weighted values of the one or more operational metrics associated with the at least one alternative route. For example, an alternative route may be determined by minimizing a cost function of weighted values of a first operational metric indicative of energy consumption and a second operational metric indicative of walking time to final destination (such as a restaurant door and/or a stadium entry point), where the preference data indicates and a second weight indicative of an attribute associated with the energy consumption a second weight associated with an attribute indicative of walking time. For example, the second weight can be larger than the first weight for a passenger with reduced mobility. The cost function can capture the preference through the weighted combination of the first operational metric and the second operation metric using the first and second weights.

In one or more example methods, determining the set of alternative routes includes performing, using the at least one processor, a plurality of searches, in parallel, through a road network towards the set of alternative destinations. In one or more example methods, the plurality of searches includes a third search based on a third operational metric and a fourth search based on a fourth operational metric different from the third operational metric. Multiple searches can be performed in parallel on the same graph representative of the road network with different operational metrics and/or cost functions. For example, the plurality of searches can be performed for different operational metrics, such as different cost functions. In other words, parallel searches can be performed for operational metrics in different operational dimensions, such as time to destination, and walking time. Each search of the plurality of searches can be based on a different operational metric. This may be seen as a multi-goal, and multi-cost exploration. For example, for a given alternative destination AltD1, a third search from the initial location can be performed to determine a third operational metric OP3 (such as an operational metric indicative of avoidance of crossing a street after drop off), and a fourth search can be performed to determine a fourth operational metric OP4 (such as an operational metric indicative of energy consumption) different from OP3. Exploration of the road network, e.g. via a graph search, can be balanced between different operational metrics (e.g. different cost functions) and/or goals (e.g. maximizing and/or minimizing and/or maintaining). A search can explore a single road network, but can switch between operational metrics (e.g. cost functions) to determine which routes to explore next. In one or more examples, the fourth operational metric has a target parameter indicative of goal diverging from a goal of the third operational metric. For example, the search may be performed by the disclosed system towards an alternative destination but following similar steps of expansion and selection illustrated in FIG. 7C.

In one or more example methods, a target parameter of the fourth operational metric diverges from a target parameter of the third operational metric. For example, at least one search is configured to explore the road network by promoting an operational metric having a cost higher than the third operational metric and/or the second operational metric, e.g. by expanding the search based on an operational metric which has a higher cost than the operational metrics obtained for the set of routes (e.g. without alternative destinations). Different operational metrics (such as cost functions) can have different goals and a set of alternative routes to the collected goals (e.g. drop off location) can be determined.

In one or more example methods, ranking the routes of the set of routes includes determining, using the at least one processor, based on common preference data, a first ranking of the routes of the set of routes. In one or more example methods, the common preference data is indicative of common preference types. A multi-cost hierarchical ranking for all routes found can be applied. First ranking is for each discrete set of common preference data, indicative of common preference types, such as price preference, time to destination preference and walking distance preference. Common preference types are preference types for a group of users, e.g. across a plurality of user, e.g. across all users. This can be illustrated in FIG. 7D.

In one or more example methods, ranking the routes of the set of routes includes determining, using the at least one processor, based on the preference data, a second ranking of the routes of the set of routes. Second ranking for overall route can be based on preference data indicative of all preferences. Preference data includes data indicative of preference regarding one or more of price, time to destination, but also includes traffic preferences, other learned preferences. Attribute can provide values weighted on learned user preference weights. Preference data indicative of the user preferences can determine the hierarchy of the multi-cost rankings. This can be illustrated in FIG. 7D.

In one or more example methods, the method 800 includes selecting, using the at least one processor, based on the preference data, a subset of highest ranked routes from the first ranking and the second ranking. For example, the top k routes are selected according to the preference data indicative of user route preferences, where k is a positive integer. The top k routes can include a top route for each of j predetermined common preference types (e.g. Price, Time to Destination, etc.) and top k-j other routes based on learned user preferences, where j is a positive integer. This is for example illustrated in FIG. 7D.

In one or more example methods, the method 800 includes selecting, using the at least one processor, based on the preference data, a highest ranked route for at least one alternative destination. For example, the top route according to learned user preferences for each of N alternative destinations is selected, where N is an integer. In one or more example systems, the system 500 is configured to provide a set of routes including N+k routes wherein k routes are according to preference data and N routes are according to alternative routes. This is for example illustrated in FIG. 7D.

In one or more example methods, the method 800 includes causing, by the at least one processor, at least a portion of the ranked routes to be presented to a passenger. e.g. via a user interface. For example, a user interface 512 is a display device (e.g. a display device of the autonomous vehicle and/or a display device of a passenger device, such as a mobile device). This is for example illustrated by user interface 700 of FIG. 7A.

In one or more example methods, the method 800 includes receiving, using the at least one processor, user input indicative of a selection of a route. The user input can be provided via the user interface 512 in form a touch input on a user interface object representative of a ranked route, as illustrated in FIG. 7A. For example, the user interface object may be displayed on a touch sensitive display. The user input can be provided via a user interface in form a user input via a button. A user interface object refers herein to a graphical representation of an object that is displayed on the display device. The user interface object may be user-interactive, or selectable by a user input. For example, an image (e.g., icon), a button, and text, each optionally constitute a user interface object. The user interface object can form part of a widget. A user interface object may comprise a prompt, application launch icon, and/or an action menu. A user input, such as first input and/or second input, may comprise a touch (e.g. a tap, a force touch, a long press), and/or movement of contact (e.g. a swipe gesture, e.g. for toggling). The movement on contact may be detected by a touch sensitive surface, e.g. on a display device.

In one or more example methods, controlling, at step 810, using the at least one processor, the navigation of the autonomous vehicle comprises controlling, using the at least one processor, based on the user input, the navigation of the autonomous vehicle. In other words, the selected route(s) can be used to plan and control the navigation of the AV. In other words, controlling, at step 810, can include generating, based on the selected route, navigation data for control of the navigation of the AV. The navigation data can be processed by a control system of the AV, such as control system 408 of FIG. 4A.

Referring now to FIG. 9, illustrated is a flowchart of a method or process 900 for providing an alternative destination, such as for operating and/or controlling an AV. The method can be performed by a system disclosed herein, such as an AV compute 400, and a vehicle 102, 200, and/or device 300 of FIGS. 1, 2, 3, 4A and/or AV compute 540, 640 of FIGS. 5 and/or 6 and implementations of FIGS. 7A-7D. The system disclosed includes at least one processor which can be configured to carry out one or more of the operations of method 900. The method 900 can be performed (e.g., completely, partially, and/or the like) by another device or group of devices separate from or including system disclosed herein.

In one or more example methods, the method 900 includes obtaining, at step 902, using at least one processor, a user destination. The user destination can be seen as a destination provided by user input, optionally via a ride service. The user destination can be provided by a ride service. The user destination can be a target destination, such as a requested destination, optionally provided via a user input from the passenger. The user destination can be one or more of: a geographic location, a point of interest, a landmark, and/or an area.

In one or more example methods, the method 900 includes obtaining, at step 904, using the at least one processor, preference data indicative of a user route preference. For example, obtaining, at step 904, using the at least one processor, preference data includes receiving and/or retrieving the preference data from a user preference database or from a preference data store, such as preference data store 504, 604 of FIGS. 5 and/or 6, such as a user preference store. The preference data may be seen as data representative of one or more user route preferences. A user route preference may be seen as a preference of a user, such as a preference of a passenger regarding a route and/or travel and/or a destination. A user route preference can be seen as a user preference, e.g. in terms of time-to-destination, price, walking time, accessibility, legality, and/or energy consumption. The preference data can include user data, such as user profile data. The user data may include passenger data indicative of one or more of: age, gender, status, and/or disability status. In one or more example systems, the preference data comprises one or more attributes indicative of the user route preference. For example, for time-to-destination, an attribute can indicate a user preference for being early at the user destination. For example, for price, an attribute can indicate a user preference for minimizing price. For example, for walking time, an attribute can indicate a user preference providing a walking distance threshold. For example, for accessibility and/or legality considerations, an attribute can indicate a user preference for avoiding crossing a street after drop-off. For example, for traffic, an attribute can indicate a user preference for avoiding traffic (e.g. minimizing). For example, for energy consumption and/or gas emission an attribute can indicate a user preference for minimizing the energy consumption and/or gas emission. In one or more examples, preference data can include historic and/or previous preference data. Previous preference data can be based on preference(s) and/or route(s) and/or drop-off(s) chosen and/or observed in the past. A passenger can optionally configure preferences at a high level, thereby resulting in corresponding preference data. For example, independent attributes, e.g. cost, walking distance, time, can be configured by the passenger, with various level of importance, e.g. "not important", "somewhat important", "very important", "highest priority". This may lead to weight(s) given to an attribute based on its corresponding level of importance. In one or more example systems, the attribute(s) can be configured by the passenger via a user interface, such as user interface, such as a user interface provided on a device of the passenger, which transmits the attribute(s) to the system. The user route preferences can vary: for example Alice prefers to walk for a few minutes rather than wait in traffic; Bob wants to be dropped as close to his final destination as possible; Eve would like as cheap a ride as possible without walking more than 1 mile. The disclosed preference data can characterize the user routes preferences via attributes.

In one or more example methods, the method 900 includes determining, at step 906, using the at least one processor, based on the user destination and the preference data, an alternative destination. The alternative destination may be seen as a destination alternative to the user destination.

In one or more example methods, the method 900 includes controlling, at step 908, using the at least one processor, based on the alternative destination, navigation of an autonomous vehicle. For example, controlling at step 908 includes generating navigation data based on the alternative destination. In one or more example methods, the method 900 includes navigating according to the alternative destination.

In one or more example methods, determining at step 906 the alternative destination includes obtaining, using the at least one processor, feature data.

In one or more example methods, the feature data comprises one or more of: time data, user data, location data, and user selection data. In one or more example methods, the feature data comprises one or more of: time data, user data, location data, and user selection data. Time data can indicate time of day, day of week, week of month, month of year at the time of travelling. User data can include one or more of: age data, gender data, disability data. Location data can include data indicative of one or more of: city block, and/or surrounding areas, etc. User selection data can indicate selections of routes of past passengers and/or other passengers and/or selections of past routes by the passenger.

In one or more example methods, determining at step 906 the alternative destination includes determining, using the at least one processor, based on the user destination, the preference data, and the feature data, the alternative destination.

In one or more example methods, determining at step 906 the alternative destination includes determining, using the at least one processor, based on the user destination, the preference data, and a neural network model, the alternative destination. In one or more example methods, the neural network model is configured to estimate the alternative destination.

In one or more example methods, the method 900 includes causing, by the at least one processor, the alternative destination to be presented to a passenger, e.g. via a user interface.

In one or more example methods, the method 900 includes receiving, using the at least one processor, user input indicative of a selection of the alternative.

In one or more example methods, controlling, using the at least one processor, the navigation of the vehicle includes controlling, using the at least one processor, based on the user input, the navigation of the autonomous vehicle.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Also disclosed is a non-transitory computer readable medium comprising instructions stored thereon that, when executed by at least one processor, cause the at least one processor to carry out operations according to any of the disclosed methods.

Also disclosed are methods, non-transitory computer readable media, and systems according to any of the following items:

Item 1. A method comprising:
 obtaining, using at least one processor, a user destination;
 obtaining, using the at least one processor, preference data indicative of a user route preference;
 determining, using the at least one processor, based on the user destination and the preference data, a set of routes towards a set of destinations, wherein at least one route of the set of routes is associated with one or more operational metrics;

ranking, using the at least one processor, based on the preference data, the routes of the set of routes; and controlling, using the at least one processor, based on at least one of the ranked routes, navigation of an autonomous vehicle.

Item 2. The method according to item 1, wherein the preference data comprises one or more attributes indicative of the user route preference.

Item 3. The method according to item 2, wherein obtaining, using the at least one processor, the preference data comprises assigning, based on a model, a weight to at least one attribute of the one or more attributes for a corresponding operational metric of the one or more operational metrics.

Item 4. The method according to item 3, wherein the model is configured to determine, based on previous routes, the assignment of the weight to an attribute of the at least one attribute.

Item 5. The method according to item 3 or item 4, wherein the model is a user-specific model.

Item 6. The method according to any of items 3-5, wherein determining the set of routes comprises determining, using the at least one processor, based on the weight, the corresponding operational metric across the at least one route.

Item 7. The method according to any of the previous items, wherein determining the set of routes comprises minimizing, using the at least one processor, across the at least one route, a cost function of weighted values of the one or more operational metrics associated with the at least one route.

Item 8. The method according to any of the previous items, wherein determining the set of routes comprises performing, using the at least one processor, a plurality of searches, in parallel, through a road network towards the set of destinations, wherein the plurality of searches comprises a first search based on a first operational metric and a second search based on a second operational metric different from the first operational metric.

Item 9. The method according to any of the previous items, the method comprising determining, using the at least one processor, based on the user destination and the preference data, an alternative destination, wherein the set of destinations includes the alternative destination.

Item 10. The method according to item 9, wherein determining the alternative destination comprises:

obtaining, using the at least one processor, feature data, wherein the feature data comprises one or more of: time data, user data, location data, and user selection data; and determining, using the at least one processor, based on the user destination, the preference data, and the feature data, the alternative destination.

Item 11. The method according to any of items 9-10, wherein determining the alternative destination comprises determining, using the at least one processor, based on the user destination, the preference data, and a neural network model, the alternative destination, wherein the neural network model is configured to estimate the alternative destination.

Item 12. The method according to any of items 9-11, wherein determining the set of routes comprises determining, using the at least one processor, based on the user destination, the preference data, and the alternative destination, a set of alternative routes.

Item 13. The method according to item 12 as dependent on item 3, wherein determining the set of alternative routes comprises determining, using the at least one processor, based on the weight, the corresponding operational metric across at least one alternative route of the set of alternative routes.

Item 14. The method according to item 13, wherein determining the set of alternative routes comprises minimizing, using the at least one processor, across the at least one alternative route, a cost function of weighted values of the one or more operational metrics associated with the at least one alternative route.

Item 15. The method according to any of items 9-14, wherein determining the set of alternative routes comprises performing, using the at least one processor, a plurality of searches, in parallel, through a road network towards the set of alternative destinations, wherein the plurality of searches comprises a third search based on a third operational metric and a fourth search based on a fourth operational metric different from the third operational metric.

Item 16. The method according to any of items 9-15, wherein a target parameter of the fourth operational metric diverges from a target parameter of the third operational metric.

Item 17. The method according to any of items 9-15, wherein ranking the routes of the set of routes comprises determining, using the at least one processor, based on common preference data, a first ranking of the routes of the set of routes, wherein the common preference data is indicative of common preference types.

Item 18. The method according to any of items 9-17, wherein ranking the routes of the set of routes comprises determining, using the at least one processor, based on the preference data, a second ranking of the routes of the set of routes.

Item 19. The method according to any of items 9-18, the method comprising selecting, using the at least one processor, based on the preference data, a subset of highest ranked routes from the first ranking and the second ranking.

Item 20. The method according to any of items 9-19, the method comprising selecting, using the at least one processor, based on the preference data, a highest ranked route for at least one alternative destination.

Item 21. The method according to any of the previous items, the method comprising:

causing, by the at least one processor, at least a portion of the ranked routes to be presented to a passenger; and receiving, using the at least one processor, user input indicative of a selection of a route;

wherein controlling, using the at least one processor, the navigation of the vehicle comprises controlling, using the at least one processor, based on the user input, the navigation of the autonomous vehicle.

Item 22. A system comprising:

at least one processor; and at least one non-transitory computer readable medium storing instructions that, when executed by the at least one processor, cause the at least one processor to perform operations comprising:

obtaining, using the at least one processor, a user destination;

obtaining, using the at least one processor, preference data indicative of a user route preference;

determining, using the at least one processor, based on the user destination and the preference data, a set of routes towards a set of destinations, wherein at least one route of the set of routes is associated with one or more operational metrics;

ranking, using the at least one processor, based on the preference data, the routes of the set of routes; and controlling, using the at least one processor, based on at least one of the ranked routes, navigation of an autonomous vehicle.

Item 23. The system according to item 22, wherein the preference data comprises one or more attributes indicative of the user route preference.

Item 24. The system according to item 23, wherein obtaining, using the at least one processor, the preference data comprises assigning, based on a model, a weight to at least one attribute of the one or more attributes for a corresponding operational metric of the one or more operational metrics.

Item 25. The system according to item 24, wherein the model is configured to determine, based on previous routes, the assignment of the weight to an attribute of the at least one attribute.

Item 26. The system according to item 24 or item 25, wherein the model is a user-specific model.

Item 27. The system according to any of items 24-26, wherein determining the set of routes comprises determining, using the at least one processor, based on the weight, the corresponding operational metric across the at least one route.

Item 28. The system according to any of items 22-27, wherein determining the set of routes comprises minimizing, using the at least one processor, across the at least one route, a cost function of weighted values of the one or more operational metrics associated with the at least one route.

Item 29. The system according to any of items 22-28, wherein determining the set of routes comprises performing, using the at least one processor, a plurality of searches, in parallel, through a road network towards the set of destinations, wherein the plurality of searches comprises a first search based on a first operational metric and a second search based on a second operational metric different from the first operational metric.

Item 30. The system according to any of items 22-29, wherein the system is configured to determine, using the at least one processor, based on the user destination and the preference data, an alternative destination, wherein the set of destinations includes the alternative destination.

Item 31. The system according to item 30, wherein determining the alternative destination comprises:
 obtaining, using the at least one processor, feature data, wherein the feature data comprises one or more of: time data, user data, location data, and user selection data; and
 determining, using the at least one processor, based on the user destination, the preference data, and the feature data, the alternative destination.

Item 32. The system according to any of items 30-31, wherein determining the alternative destination comprises determining, using the at least one processor, based on the user destination, the preference data, and a neural network model, the alternative destination, wherein the neural network model is configured to estimate the alternative destination.

Item 33. The system according to any of items 30-32, wherein determining the set of routes comprises determining, using the at least one processor, based on the user destination, the preference data, and the alternative destination, a set of alternative routes.

Item 34. The system according to item 33 as dependent on item 24, wherein determining the set of alternative routes comprises determining, using the at least one processor, based on the weight, the corresponding operational metric across at least one alternative route of the set of alternative routes.

Item 35. The system according to item 34, wherein determining the set of alternative routes comprises to minimize, using the at least one processor, across the at least one alternative route, a cost function of weighted values of the one or more operational metrics associated with the at least one alternative route.

Item 36. The system according to any of items 30-35, wherein to determine the set of alternative routes comprises to perform, using the at least one processor, a plurality of searches, in parallel, through a road network towards the set of alternative destinations, wherein the plurality of searches comprises a third search based on a third operational metric and a fourth search based on a fourth operational metric different from the third operational metric.

Item 37. The system according to any of items 30-36, wherein a target parameter of the fourth operational metric diverges from a target parameter of the third operational metric.

Item 38. The system according to any of items 30-36, wherein ranking the routes of the set of routes comprises to determine, using the at least one processor, based on common preference data, a first ranking of the routes of the set of routes, wherein the common preference data is indicative of common preference types.

Item 39. The system according to any of items 30-38, wherein ranking the routes of the set of routes comprises determining, using the at least one processor, based on the preference data, a second ranking of the routes of the set of routes.

Item 40. The system according to any of items 30-39, the system is configured to select, using the at least one processor, based on the preference data, a subset of highest ranked routes from the first ranking and the second ranking.

Item 41. The system according to any of items 30-40, the system is configured to select, using the at least one processor, based on the preference data, a highest ranked route for at least one alternative destination.

Item 42. The system according to any of items 22-41, the system is configured to:
 cause, by the at least one processor, at least a portion of the ranked routes to be presented to a passenger; and
 receive, using the at least one processor, user input indicative of a selection of a route;
 wherein to control, using the at least one processor, the navigation of the vehicle comprises to control, using the at least one processor, based on the user input, the navigation of the autonomous vehicle.

Item 43. A non-transitory computer readable medium comprising instructions stored thereon that, when executed by at least one processor, cause the at least one processor to carry out operations comprising:
 obtaining, using the at least one processor, a user destination;
 obtaining, using the at least one processor, preference data indicative of a user route preference;
 determining, using the at least one processor, based on the user destination and the preference data, a set of routes towards a set of destinations, wherein at least one route of the set is associated with one or more operational metrics;
 ranking, using the at least one processor, based on the preference data, the routes of the set of routes; and
 controlling, using the at least one processor, based on at least one of the ranked routes, navigation of an autonomous vehicle.

Item 44. A method comprising:
obtaining, using at least one processor, a user destination;
obtaining, using the at least one processor, preference data indicative of a user route preference;
determining, using the at least one processor, based on the user destination and the preference data, an alternative destination; and
controlling, using the at least one processor, based on the alternative destination, navigation of an autonomous vehicle.

Item 45. The method according to item 44, wherein determining the alternative destination comprises:
obtaining, using the at least one processor, feature data, wherein the feature data comprises one or more of: time data, user data, location data, and user selection data; and
determining, using the at least one processor, based on the user destination, the preference data, and the feature data, the alternative destination.

Item 46. The method according to any of items 44-45, wherein determining the alternative destination comprises determining, using the at least one processor, based on the user destination, the preference data, and a neural network model, the alternative destination, wherein the neural network model is configured to estimate the alternative destination.

Item 47. The method according to any of items 44-46, the method comprising:
causing, by the at least one processor, the alternative destination to be presented to a passenger; and
receiving, using the at least one processor, user input indicative of a selection of the alternative;
wherein controlling, using the at least one processor, the navigation of the vehicle comprises controlling, using the at least one processor, based on the user input, the navigation of the autonomous vehicle.

Item 48. A system comprising:
at least one processor; and
at least one non-transitory computer readable medium storing instructions that, when executed by the at least one processor, cause the at least one processor to perform operations comprising:
obtaining, using the at least one processor, a user destination;
obtaining, using the at least one processor, preference data indicative of a user route preference;
determining, using the at least one processor, based on the user destination and the preference data, an alternative destination; and
controlling, using the at least one processor, based on the alternative destination, navigation of an autonomous vehicle.

Item 49. The system according to item 48 wherein determining the alternative destination comprises to:
obtain, using the at least one processor, feature data, wherein the feature data comprises one or more of: time data, user data, location data, and user selection data; and
determine, using the at least one processor, based on the user destination, the preference data, and the feature data, the alternative destination.

Item 50. The system according to any of items 48-49, wherein determining the alternative destination comprises determining, using the at least one processor, based on the user destination, the preference data, and a neural network model, the alternative destination, wherein the neural network model is configured to estimate the alternative destination.

Item 51. The system according to any of items 48-50, the system comprises to:
cause, by the at least one processor, the alternative destination to be presented to a passenger; and
receive, using the at least one processor, user input indicative of a selection of the alternative;
wherein to control, using the at least one processor, the navigation of the vehicle comprises to control, using the at least one processor, based on the user input, the navigation of the autonomous vehicle.

Item 52. A non-transitory computer readable medium comprising instructions stored thereon that, when executed by at least one processor, cause the at least one processor to carry out operations comprising:
obtaining, using at least one processor, a user destination;
obtaining, using at least one processor, preference data indicative of a user route preference;
determining, using at least one processor, based on the user destination and the preference data, an alternative destination; and
controlling, using at least one processor, based on the alternative destination, navigation of a vehicle.

What is claimed is:

1. A method comprising:
obtaining, using at least one processor, a user destination for an autonomous vehicle;
obtaining, using the at least one processor, preference data indicative of a user route preference;
performing in parallel, using the at least one processor:
a first search for a first route through a road network to the user destination using a first operational metric and a first optimization goal for the first operational metric, and
a second search for a second route through the road network to the user destination using a second operational metric and a second optimization goal for the second operational metric, wherein the second operational metric is different from the first operational metric and the second optimization goal is different from the first optimization goal;
ranking, using the at least one processor, based on the preference data, the first route and the second route in a first ranking and a second ranking, wherein the first ranking uses a first set of the preference data to rank the first route and the second route and the second ranking uses a second set of the preference data to rank the first route and the second route, wherein the first set of the preference data is different from the first optimization goal and the second set of the preference data is different from the second optimization goal;
selecting the first route or the second route as a driving route based on the first ranking and the second ranking; and
controlling, using the at least one processor, navigation of the autonomous vehicle based on the selected driving route, wherein controlling navigation comprises controlling at least one of steering, breaking, or acceleration of the autonomous vehicle.

2. The method of claim 1, wherein the preference data comprises one or more attributes indicative of the user route preference.

3. The method of claim 2, wherein obtaining, using the at least one processor, the preference data comprises assigning, based on a model, a weight to at least one of the first operational metric or the second operational metric.

4. The method of claim 3, wherein the model is configured to determine, based on previous routes, the assignment of the weight to the at least one of the first operational metric or the second operational metric.

5. The method of claim 3, wherein the model is a user-specific model.

6. The method of claim 3, wherein ranking the first route and the second route in the first ranking and the second ranking comprises ranking, using the at least one processor, based on the weight, the first route and the second route.

7. The method of claim 3, further comprising:
determining, using the at least one processor, an alternative destination based on the user destination and the preference data;
determining using the at least one processor, based on the user destination, the preference data, and the alternative destination, at least one alternative route, and
determining, using the at least one processor, based on the weight, a corresponding operational metric across the at least one alternative route.

8. The method of claim 7, wherein determining the at least one alternative route comprises minimizing, using the at least one processor, across the at least one alternative route, a cost function of weighted values of the corresponding operational metric.

9. The method of claim 7, wherein determining the at least one alternative route comprises performing, using the at least one processor, a plurality of searches, in parallel, through a road network towards the alternative destination, wherein the plurality of searches comprises a third search based on a third operational metric and a fourth search based on a fourth operational metric different from the third operational metric.

10. The method of claim 9, wherein a target parameter of the fourth operational metric diverges from a target parameter of the third operational metric.

11. The method of claim 1, wherein the first optimization goal comprises a minimization of a cost function of weighted values of the first operational metric.

12. The method of claim 1, further comprising:
determining, using the at least one processor, an alternative destination based on the user destination and the preference data,
wherein determining the alternative destination comprises:
obtaining, using the at least one processor, feature data, wherein the feature data comprises one or more of: time data, user data, location data, and user selection data; and
determining, using the at least one processor, based on the user destination, the preference data, and the feature data, the alternative destination.

13. The method of claim 1, further comprising:
determining, using the at least one processor, an alternative destination based on the user destination and the preference data,
wherein determining the alternative destination comprises determining, using the at least one processor, based on the user destination, the preference data, and a neural network model, the alternative destination, wherein the neural network model is configured to estimate the alternative destination.

14. The method of claim 1, wherein the first set of the preference data used in the first ranking of the first route and the second route comprises common preference data wherein the common preference data is indicative of common preference types.

15. The method of claim 1, wherein the second set of the preference data used in the second ranking of the first route and the second route comprises preference data indicative of all preferences.

16. The method of claim 1, further comprising selecting, using the at least one processor, based on the preference data, a highest ranked route from the first ranking and the second ranking.

17. The method of claim 1, wherein the second optimization goal diverges from the first optimization goal.

18. The method of claim 1, further comprising:
causing, by the at least one processor, the first route and the second route to be displayed on a display; and
receiving, using the at least one processor, user input indicative of a selection of at least one of the first route or the second route;
wherein controlling, using the at least one processor, the navigation of the autonomous vehicle comprises controlling, using the at least one processor, based on the user input, the navigation of the autonomous vehicle.

19. The method of claim 1, wherein the preference data comprises learned route preferences of a user based on previously traveled routes.

20. A system comprising:
at least one processor; and
at least one non-transitory computer readable medium storing instructions that, when executed by the at least one processor, cause the at least one processor to perform operations comprising:
obtaining, a user destination for an autonomous vehicle;
obtaining, preference data indicative of a user route preference;
performing in parallel, using the at least one processor:
a first search for a first route through a road network to the user destination using a first operational metric and a first optimization goal for the first operational metric, and
a second search for a second route through the road network to the user destination using a second operational metric and a second optimization goal for the second operational metric, wherein the second operational metric is different from the first operational metric and the second optimization goal is different from the first optimization goal;
ranking, based on the preference data, the first route and the second route in a first ranking and a second ranking, wherein the first ranking uses a first set of the preference data to rank the first route and the second route and the second ranking uses a second set of the preference data to rank the first route and the second route, wherein the first set of the preference data is different from the first optimization goal and the second set of the preference data is different from the second optimization goal;
selecting the first route or the second route as a driving route based on the first ranking and the second ranking; and
controlling navigation of the autonomous vehicle based on the selected driving route, wherein controlling navigation comprises controlling at least one of steering, breaking, or acceleration of the autonomous vehicle.

21. A method comprising:
obtaining, using at least one processor, a user destination for an autonomous vehicle;
obtaining, using the at least one processor, preference data indicative of a user route preference;

performing in parallel, using the at least one processor:
  a first search for a first route through a road network to the user destination using a first operational metric and a first optimization goal for the first operational metric, and
  a second search for a second route through the road network to the user destination using a second operational metric and a second optimization goal for the second operational metric, wherein the second operational metric is different from the first operational metric and the second optimization goal is different from the first optimization goal;
ranking, using the at least one processor, the first route and the second route for provision of a first ranking based on a first set of the preference data, wherein the first set of the preference data is different from the first optimization goal and the second set of preference data is different from the second optimization goal;
ranking, using the at least one processor, the first route and the second route for provision of a second ranking based on a second set of the preference data, wherein the second set of the preference data is different from the first optimization goal and the second set of preference data is different from the second optimization goal;
selecting the first route or the second route as a driving route based on the first ranking and the second ranking; and
controlling, using the at least one processor, navigation of the autonomous vehicle based on the selected driving route wherein controlling navigation comprises controlling one or more of: steering, breaking, and acceleration of the autonomous vehicle.

22. The method of claim 21, further comprising determining an alternative destination based on the user destination and the preference data, wherein determining the alternative destination comprises:
  obtaining, using the at least one processor, feature data, wherein the feature data comprises one or more of: time data, user data, location data, and user selection data; and
  determining, using the at least one processor, based on the user destination, the preference data, and the feature data, the alternative destination.

23. The method of claim 22, wherein determining the alternative destination comprises determining, using the at least one processor, based on the user destination, the preference data, and a neural network model, the alternative destination, wherein the neural network model is configured to estimate the alternative destination.

24. The method of claim 22, further comprising:
  causing, by the at least one processor, the alternative destination to be presented to a user, and
  receiving, using the at least one processor, user input indicative of a selection of the alternative destination;
  wherein controlling, using the at least one processor, the navigation of the autonomous vehicle comprises controlling, using the at least one processor, based on the user input, the navigation of the autonomous vehicle.

25. A system comprising:
at least one processor; and
at least one non-transitory computer readable medium storing instructions that, when executed by the at least one processor, cause the at least one processor to perform operations comprising:
obtaining, a user destination for an autonomous vehicle;
obtaining, preference data indicative of a user route preference;
performing in parallel, using the at least one processor:
  a first search for a first route through a road network to the user destination using a first operational metric and a first optimization goal for the first operational metric, and
  a second search for a second route through the road network to the user destination using a second operational metric and a second optimization goal for the second operational metric, wherein the second operational metric is different from the first operational metric and the second optimization goal is different from the first optimization goal;
ranking, the first route and the second route for provision of a first ranking based on a first set of the preference data, wherein the first set of the preference data is different from the first optimization goal and the first set of preference data is different from the second optimization goal;
ranking, the first route and the second route for provision of a second ranking based on second set of the preference data, wherein the second set of the preference data is different from the first optimization goal and the second set of the preference data is different from the second optimization goal;
selecting the first route or the second route as a driving route based on the first ranking and the second ranking; and
controlling, navigation of the autonomous vehicle based on the selected driving route, wherein controlling navigation comprises controlling one or more of: steering, breaking, and acceleration of the autonomous vehicle.

26. The system of claim 25, the operations further comprising determining an alternative destination based on the user destination and the preference data, and wherein determining the alternative destination comprises:
  obtaining, feature data, wherein the feature data comprises one or more of: time data, user data, location data, and user selection data; and
  determining, based on the user destination, the preference data, and the feature data, the alternative destination.

27. The system of claim 26, wherein determining the alternative destination comprises determining, based on the user destination, the preference data, and a neural network model, the alternative destination, wherein the neural network model is configured to estimate the alternative destination.

28. The system of claim 26, wherein the operations further comprise:
  causing, by the at least one processor, the alternative destination to be presented to a user, and
  receiving, user input indicative of a selection of the alternative destination,
  wherein controlling the navigation of the autonomous vehicle comprises controlling, based on the user input, the navigation of the autonomous vehicle.

* * * * *